United States Patent
Hayward

(10) Patent No.: US 11,061,408 B1
(45) Date of Patent: *Jul. 13, 2021

(54) FACILITATING SAFER VEHICLE TRAVEL UTILIZING TELEMATICS DATA

(71) Applicant: State Farm Mutual Automobile Insurance Company, Bloomington, IL (US)

(72) Inventor: Gregory Hayward, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 80 days.

This patent is subject to a terminal disclaimer.

(21) Appl. No.: 16/379,319

(22) Filed: Apr. 9, 2019

Related U.S. Application Data

(63) Continuation of application No. 16/002,142, filed on Jun. 7, 2018, now Pat. No. 10,359,782, which is a (Continued)

(51) Int. Cl.
   *G05D 1/02* (2020.01)
   *G01C 21/34* (2006.01)
   (Continued)

(52) U.S. Cl.
   CPC ....... *G05D 1/0278* (2013.01); *G01C 21/3492* (2013.01); *G01C 21/3667* (2013.01);
   (Continued)

(58) Field of Classification Search
   CPC .. G05D 1/0278; G05D 1/0285; G05D 1/0223; G05D 2201/0213; G01C 21/3492;
   (Continued)

(56) References Cited

U.S. PATENT DOCUMENTS 6,437,688 B1  8/2002 Kobayashi
6,459,371 B1  10/2002 Pike
(Continued)

FOREIGN PATENT DOCUMENTS

JP  2012-126273 A  7/2012
WO  2018/102280 A1  6/2018

OTHER PUBLICATIONS

U.S. Appl. No. 17/798,609, Methods of Providing Insurance Savings Based Upon Telematics and Anonymous Driver Data, filed Jul. 14, 2015.

(Continued)

*Primary Examiner* — Yuen Wong

(57) ABSTRACT

Various devices are described, which are configured to use telematics data from one driver to facilitate safer vehicle travel for another driver. A remote server may include (1) a communication unit configured to receive a broadcast including telematics data generated and transmitted from a first mobile device or smart vehicle; and (2) a processor configured to determine (i) a travel event; (ii) a GPS location of the travel event; and/or (iii) an estimated or actual geographical or temporal scope of the travel event from computer analysis of the telematics data. The remote server may transmit a travel event-related wireless communication to a second mobile device or smart vehicle to facilitate safer vehicle travel for a second driver or vehicle based upon the telematics data associated with the first driver/vehicle. Insurance discounts may be provided for individuals or vehicles based upon having or using the risk mitigation or prevention functionality.

20 Claims, 8 Drawing Sheets

Related U.S. Application Data continuation of application No. 15/860,841, filed on Jan. 3, 2018, now Pat. No. 10,042,364, which is a continuation of application No. 14/990,121, filed on Jan. 7, 2016, now Pat. No. 9,904,289.

(60) Provisional application No. 62/250,286, filed on Nov. 3, 2015, provisional application No. 62/247,334, filed on Oct. 28, 2015, provisional application No. 62/232,054, filed on Sep. 24, 2015, provisional application No. 62/232,050, filed on Sep. 24, 2015, provisional application No. 62/232,065, filed on Sep. 24, 2015, provisional application No. 62/232,097, filed on Sep. 24, 2015, provisional application No. 62/232,083, filed on Sep. 24, 2015, provisional application No. 62/232,075, filed on Sep. 24, 2015, provisional application No. 62/232,090, filed on Sep. 24, 2015, provisional application No. 62/232,035, filed on Sep. 24, 2015, provisional application No. 62/232,045, filed on Sep. 24, 2015, provisional application No. 62/207,561, filed on Aug. 20, 2015, provisional application No. 62/204,749, filed on Aug. 13, 2015, provisional application No. 62/113,749, filed on Feb. 9, 2015, provisional application No. 62/105,468, filed on Jan. 20, 2015.

(51) Int. Cl.
   *G06Q 10/04* (2012.01)
   *G06Q 40/08* (2012.01)
   *G01C 21/36* (2006.01)
   *G01S 19/42* (2010.01)

(52) U.S. Cl.
   CPC ............ *G01S 19/42* (2013.01); *G05D 1/0223* (2013.01); *G05D 1/0285* (2013.01); *G06Q 10/047* (2013.01); *G06Q 40/08* (2013.01); *G05D 2201/0213* (2013.01)

(58) Field of Classification Search
   CPC .. G01C 21/3667; G06Q 10/047; G06Q 40/08; G01S 19/42
   See application file for complete search history.

(56) References Cited

U.S. PATENT DOCUMENTS

| | | | |
|---|---|---|---|
| 7,280,898 B2 | 10/2007 | Lesesky et al. | |
| 7,421,334 B2 | 9/2008 | Dahlgren et al. | |
| 8,117,049 B2 | 2/2012 | Berkobin et al. | |
| 8,311,858 B2 | 11/2012 | Everett et al. | |
| 8,731,768 B2 | 5/2014 | Fernandes et al. | |
| 8,731,977 B1 | 5/2014 | Hardin et al. | |
| 8,799,032 B2 | 8/2014 | Fernandes et al. | |
| 8,805,707 B2 | 8/2014 | Schumann et al. | |
| 8,862,486 B2 | 10/2014 | Cordova et al. | |
| 8,922,393 B2 | 12/2014 | Ricci | |
| 8,924,240 B2 | 12/2014 | Depura et al. | |
| 8,935,036 B1 | 1/2015 | Christensen et al. | |
| 9,014,911 B2 | 4/2015 | Ricci | |
| 9,031,545 B1 | 5/2015 | Srey et al. | |
| 9,037,394 B2 | 5/2015 | Fernandes et al. | |
| 9,043,130 B2 | 5/2015 | Ricci | |
| 9,046,374 B2 | 6/2015 | Ricci | |
| 9,047,778 B1 * | 6/2015 | Cazanas ................. G08G 1/166 | |
| 9,105,051 B2 | 8/2015 | Ricci | |
| 9,111,316 B2 | 8/2015 | Fernandes et al. | |
| 9,123,058 B2 | 9/2015 | Ricci | |
| 9,129,449 B2 | 9/2015 | Davidson | |
| 9,159,232 B2 | 10/2015 | Ricci | |
| 9,164,957 B2 | 10/2015 | Hassib et al. | |
| 9,176,924 B2 | 11/2015 | Ricci | |
| 9,240,018 B2 | 1/2016 | Ricci | |
| 9,355,423 B1 | 5/2016 | Slusar | |
| 9,390,451 B1 | 7/2016 | Slusar | |
| 9,398,423 B2 | 7/2016 | Cordova et al. | |
| 9,421,864 B1 | 8/2016 | Srey et al. | |
| 9,443,270 B1 | 9/2016 | Friedman et al. | |
| 9,454,786 B1 | 9/2016 | Srey et al. | |
| 9,558,520 B2 | 1/2017 | Peak et al. | |
| 9,619,203 B2 | 4/2017 | Tamir et al. | |
| 9,633,318 B2 | 4/2017 | Plante | |
| 9,672,569 B2 | 6/2017 | Fernandes et al. | |
| 9,672,571 B2 | 6/2017 | Fernandes et al. | |
| 9,679,487 B1 | 6/2017 | Hayward | |
| 9,783,159 B1 | 10/2017 | Potter et al. | |
| 9,786,154 B1 | 10/2017 | Potter et al. | |
| 9,841,767 B1 | 12/2017 | Hayward | |
| 9,904,289 B1 | 2/2018 | Hayward | |
| 9,911,159 B1 | 3/2018 | Srey et al. | |
| 9,932,033 B2 | 4/2018 | Slusar et al. | |
| 10,012,987 B2 | 7/2018 | Shem et al. | |
| 10,023,114 B2 | 7/2018 | Adams et al. | |
| 10,032,226 B1 | 7/2018 | Suizzo et al. | |
| 10,037,578 B2 | 7/2018 | Bogovich et al. | |
| 10,037,579 B2 | 7/2018 | Bogovich et al. | |
| 10,037,580 B2 | 7/2018 | Bogovich et al. | |
| 10,042,363 B1 | 8/2018 | Hayward | |
| 10,042,364 B1 * | 8/2018 | Hayward ............... G08G 1/166 |
| 10,054,453 B1 | 8/2018 | Hayward | |
| 10,055,982 B1 | 8/2018 | Hayward | |
| 10,055,985 B1 | 8/2018 | Hayward | |
| 10,074,139 B2 | 9/2018 | Bogovich et al. | |
| 10,089,868 B1 | 10/2018 | Hayward | |
| 10,096,038 B2 | 10/2018 | Ramirez et al. | |
| 10,096,067 B1 | 10/2018 | Slusar | |
| 10,096,070 B1 | 10/2018 | Slusar et al. | |
| 10,109,016 B1 | 10/2018 | Saenglongma | |
| 10,121,204 B1 | 11/2018 | Brandmaier et al. | |
| 10,134,091 B2 | 11/2018 | Adams et al. | |
| 10,157,422 B2 | 12/2018 | Jordan et al. | |
| 10,169,822 B2 | 1/2019 | Jarvis et al. | |
| 10,198,772 B2 | 2/2019 | Parameshwaran | |
| 10,210,772 B2 | 2/2019 | Tamir et al. | |
| 10,216,194 B1 | 2/2019 | Hayward | |
| 10,216,195 B2 | 2/2019 | Switkes et al. | |
| 10,217,169 B2 | 2/2019 | Schumann et al. | |
| 10,229,462 B2 | 3/2019 | Bogovich et al. | |
| 10,231,093 B2 | 3/2019 | Cordova et al. | |
| 10,234,871 B2 | 3/2019 | Klaus et al. | |
| 10,255,638 B2 | 4/2019 | Cote et al. | |
| 10,255,639 B1 | 4/2019 | Friedman et al. | |
| 10,317,223 B1 | 6/2019 | Hayward | |
| 10,354,333 B1 | 7/2019 | Hayward | |
| 10,360,636 B1 | 7/2019 | Kraft et al. | |
| 10,380,699 B2 | 8/2019 | Fernandes et al. | |
| 10,395,319 B1 | 8/2019 | Srey et al. | |
| 10,395,320 B1 | 8/2019 | Srey et al. | |
| 10,417,713 B1 | 9/2019 | Brandmaier et al. | |
| 10,438,424 B2 | 10/2019 | Hassib et al. | |
| 10,445,758 B1 | 10/2019 | Bryer et al. | |
| 10,453,352 B1 | 10/2019 | Hayward | |
| 10,509,414 B1 | 12/2019 | Hayward | |
| 10,571,908 B2 | 2/2020 | Joyce et al. | |
| 10,572,943 B1 | 2/2020 | Tye et al. | |
| 10,634,507 B2 | 4/2020 | Krishnan et al. | |
| 10,657,597 B1 | 5/2020 | Billman et al. | |
| 10,664,918 B1 | 5/2020 | Slusar | |
| 10,699,350 B1 | 6/2020 | Suizzo et al. | |
| 10,726,495 B1 | 7/2020 | Saenglongma | |
| 10,726,687 B2 | 7/2020 | Song et al. | |
| 10,733,673 B1 | 8/2020 | Slusar | |
| 10,740,850 B1 | 8/2020 | Slusar | |
| 10,755,566 B2 | 8/2020 | Tennent et al. | |
| 10,775,179 B1 | 9/2020 | Hayward | |
| 10,783,586 B1 | 9/2020 | Augustine et al. | |
| 10,783,587 B1 | 9/2020 | Augustine et al. | |
| 10,787,122 B2 | 9/2020 | Adams et al. | |
| 10,796,369 B1 | 10/2020 | Augustine et al. | |
| 10,803,525 B1 | 10/2020 | Augustine et al. | |
| 10,803,529 B2 | 10/2020 | Adams et al. | |

(56) References Cited

U.S. PATENT DOCUMENTS

| | | |
|---|---|---|
| 2005/0065711 A1 | 3/2005 | Dahlgren et al. |
| 2007/0054685 A1 | 3/2007 | Kellum |
| 2007/0159354 A1 | 7/2007 | Rosenberg |
| 2010/0015963 A1 | 1/2010 | Hesse et al. |
| 2010/0191391 A1 | 7/2010 | Zeng |
| 2010/0286864 A1 | 11/2010 | Kawauchi et al. |
| 2010/0312466 A1 | 12/2010 | Katzer et al. |
| 2011/0161116 A1 | 6/2011 | Peak et al. |
| 2012/0101855 A1 | 4/2012 | Collins et al. |
| 2012/0303392 A1 | 11/2012 | Depura et al. |
| 2013/0013347 A1 | 1/2013 | Ling et al. |
| 2013/0013348 A1 | 1/2013 | Ling et al. |
| 2013/0030642 A1 | 1/2013 | Bradley et al. |
| 2013/0090139 A1 | 4/2013 | McHenry et al. |
| 2013/0169812 A1 | 7/2013 | Lu et al. |
| 2014/0046701 A1 | 2/2014 | Steinberg et al. |
| 2014/0081675 A1* | 3/2014 | Ives .................. G06Q 40/08 705/4 |
| 2014/0142799 A1 | 5/2014 | Ferguson et al. |
| 2014/0309806 A1 | 10/2014 | Ricci |
| 2014/0309870 A1 | 10/2014 | Ricci et al. |
| 2014/0309880 A1 | 10/2014 | Ricci |
| 2014/0309886 A1 | 10/2014 | Ricci |
| 2014/0309891 A1 | 10/2014 | Ricci |
| 2014/0310594 A1 | 10/2014 | Ricci et al. |
| 2014/0310610 A1 | 10/2014 | Ricci |
| 2014/0310739 A1 | 10/2014 | Ricci et al. |
| 2014/0320260 A1 | 10/2014 | Van Wiemeersch et al. |
| 2014/0330596 A1 | 11/2014 | Depura et al. |
| 2015/0077236 A1 | 3/2015 | Le Masurier |
| 2015/0127570 A1 | 5/2015 | Doughty et al. |
| 2015/0145995 A1 | 5/2015 | Shahraray et al. |
| 2015/0179062 A1* | 6/2015 | Ralston ................ G01C 21/26 701/117 |
| 2015/0232065 A1 | 8/2015 | Ricci et al. |
| 2015/0262487 A1 | 9/2015 | Cazanas et al. |
| 2015/0266473 A1 | 9/2015 | Hayasaka |
| 2015/0353014 A1 | 12/2015 | Li |
| 2016/0021178 A1 | 1/2016 | Liu et al. |
| 2016/0042644 A1 | 2/2016 | Velusamy |
| 2016/0192108 A1 | 6/2016 | Chaudhary et al. |
| 2016/0205419 A1 | 7/2016 | Ricci et al. |
| 2016/0232791 A1 | 8/2016 | Tosa et al. |
| 2016/0277601 A1 | 9/2016 | Seymour |
| 2016/0334227 A1 | 11/2016 | Davidson |
| 2017/0021764 A1 | 1/2017 | Adams et al. |
| 2017/0075701 A1 | 3/2017 | Ricci et al. |
| 2017/0120906 A1 | 5/2017 | Penilla et al. |
| 2017/0178498 A1 | 6/2017 | McErlean |
| 2017/0337813 A1 | 11/2017 | Taylor |
| 2018/0022327 A1 | 1/2018 | Kitagawa et al. |
| 2018/0096601 A1 | 4/2018 | Chow et al. |
| 2018/0144633 A1 | 5/2018 | Minemura et al. |
| 2018/0201263 A1 | 7/2018 | Slusar et al. |

OTHER PUBLICATIONS

U.S. Appl. No. 14/798,615, Methods of Providing Insurance Savings Based Upon Telematics and Driving Behavior identification, filed Jul. 14, 2015.
U.S. Appl. No. 14/798,626, Methods of Providing Insurance Savings Based Upon Telematics and Usage-Based insurance, filed Jul. 14, 2015.
U.S. Appl. No. 14/798,633, Methods of Providing Insurance Savings Based Upon Telematics and Insurance Incentives, filed Jul. 14, 2015.
U.S. Appl. No. 14/798,741, Methods of Determining Accident Cause and/or Fault Using Telematics Data, filed Jul. 14, 2015.
U.S. Appl. No. 14/798,745, Methods of Reconstructing an Accident Scene Using Telematics Data filed Jul. 14, 2015.
U.S. Appl. No. 14/798,750, Methods of Insurance Claim Buildup Detection Using Telematics Data, filed Jul. 14, 2015.
U.S. Appl. No. 14/798,757, Methods of Facilitating Emergency Assistance, filed Jul. 14, 2015.
U.S. Appl. No. 14/798,763, Methods of Intelligent Routing, filed Jul. 14, 2015.
U.S. Appl. No. 14/798,769, Methods of Theft Prevention or Mitigation, filed Jul. 14, 2015.
U.S. Appl. No. 14/798,770, Methods of Pre-Generating Insurance Claims, filed Jul. 14, 2015.
U.S. Appl. No. 14/989,946, Alert Notifications Utilizing Broadcasted Telematics Data, filed Jan. 7, 2016.
U.S. Appl. No. 14/989,946, Nonfinal Office Action, dated Dec. 9, 2016.
U.S. Appl. No. 14/989,946, Notice of Allowance, dated Mar. 17, 2017.
U.S. Appl. No. 14/989,950, Advisory Action, dated Jun. 21, 2017.
U.S. Appl. No. 14/989,950, Broadcasting Telematics Data to Nearby Mobile Computing Devices, Vehicles, and Infrastructure, filed Jan. 7, 2016.
U.S. Appl. No. 14/989,950, Final Office Action, dated Apr. 19, 2017.
U.S. Appl. No. 14/989,950, Nonfinal Office Action, dated Nov. 18, 2016.
U.S. Appl. No. 14/989,950, Notice of Allowance, dated Sep. 12, 2017.
U.S. Appl. No. 14/989,979, Advisory Action, dated Jun. 26, 2017.
U.S. Appl. No. 14/989,979, Determining Abnormal Traffic Conditions from a Broadcast of Telematics Data Originating from Another Vehicle, filed Jan. 7, 2016.
U.S. Appl. No. 14/989,979, Final Office Action, dated Apr. 24, 2017.
U.S. Appl. No. 14/989,979, Nonfinal Office Action, dated Nov. 30, 2016.
U.S. Appl. No. 14/969,979, Notice of Allowance, dated Sep. 14, 2017.
U.S. Appl. No. 14/989,990, Taking Corrective Action Based Upon Telematics Data Broadcast from Another Vehicle, filed Jan. 7, 2016.
U.S. Appl. No. 14/990,056, Advisory Action, dated Jul. 6, 2017.
U.S. Appl. No. 14/990,056, Analyzing Telematics Data to Determine Travel Events and Corrective Actions, filed Jan. 7, 2016.
U.S. Appl. No. 14/990,056, Final Office Action, dated Apr. 21, 2017.
U.S. Appl. No. 14/990,056, Nonfinal Office Action, dated Dec. 1, 2016.
U.S. Appl. No. 14/990,056, Notice of Allowance, dated Sep. 13, 2017.
U.S. Appl. No. 14/990,073, Providing Insurance Discounts Based Upon Usage of Telematics Data-Based Risk Mitigation and Prevention Functionality, filed Jan. 7, 2016.
U.S. Appl. No.14/990,116, Notice of Allowance, dated Sep. 13, 2017.
U.S. Appl. No. 14/990,116, Advisory Action, dated Jun. 28, 2017.
U.S. Appl. No. 14/990,116, Determining Corrective Actions Based Upon Broadcast of Telematics Data Originating From Another Vehicle, filed Jan. 7, 2016.
U.S. Appl. No. 14/990,116, Final Office Action, dated Apr. 19, 2017.
U.S. Appl. No. 14/990,116, Nonfinal Office Action, dated Nov. 25, 2016.
U.S. Appl. No. 14/990,121, Advisory Action, dated Jul. 17, 2017.
U.S. Appl. No. 14/990,121, Facilitating Safer Vehicle Travel Utilizing Telematics Data, filed Jan. 7, 2016.
U.S. Appl. No. 14/990,121, Final Office Action, dated Apr. 19, 2017.
U.S. Appl. No. 14/990,121, Nonfinal Office Action, dated Dec. 15, 2016.
U.S. Appl. No. 14/990,121, Notice of Allowance, dated Oct. 10, 2017.
U.S. Appl. No. 14/990,139, Final Office Action, dated Apr. 19, 2017.
U.S. Appl. No. 14/990,139, Nonfinal Office Action, dated Nov. 18, 2016.
U.S. Appl. No. 14/990,139, Notice of Allowance, dated Aug. 14, 2017.
U.S. Appl. No. 14/990,139, Using Train Telematics Data to Reduce Accident Risk, filed Jan. 7, 2016.
U.S. Appl. No. 14/990,165, Final Office Action, dated Apr. 19, 2017.
U.S. Appl. No. 14/990,165, Nonfinal Office Action, dated Nov. 23, 2016.

(56) References Cited

OTHER PUBLICATIONS

U.S. Appl. No. 14/990,165, Notice of Allowance, dated Aug. 10, 2017.
U.S. Appl. No. 14/990,165, Using Train Telematics Data to Provide Information in One or More Vehicles to Reduce Accident Risk, filed Jan. 7, 2016.
U.S. Appl. No. 14/990,209, Corrected Notice of Allowability, dated Aug. 28, 2017.
U.S. Appl. No. 14/990,209, Final Office Action, dated Apr. 20, 2017.
U.S. Appl. No. 14/990,209, Nonfinal Office Action, dated Nov. 18, 2016.
U.S. Appl. No. 14/990,209, Notice of Allowance, dated Aug. 16, 2017.
U.S. Appl. No.14/990,209, Using Emergency Response System (EMS) Vehicle Telematics Data to Reduce Accident Risk, filed Jan. 7, 2016.
U.S. Appl. No. 14/990,228, Broadcasting Information Related to Hazards Impacting Vehicle Travel, filed Jan. 7, 2016.
U.S. Appl. No. 14/990,228, Final Office Action, dated Apr. 20, 2017.
U.S. Appl. No. 14/990,228, Nonfinal Office Action, dated Dec. 15, 2016.
U.S. Appl. No.14/990,228, Notice of Allowance, dated Aug. 31, 2017.
U.S. Appl. No. 15/484,791, Alert Notifications Utilizing Broadcasted Telematics Data, filed Apr. 11, 2017.
U.S. Appl. No. 15/484,791, Nonfinal Office Action, dated Oct. 18, 2017.
U.S. Appl. No. 15/676,460, Methods of Theft Prevention or Mitigation, filed Aug. 14, 2017.
U.S. Appl. No. 15/676,470, Methods of Facilitating Emergency Assistance, filed Aug. 14, 2017.
U.S. Appl. No. 15/787,293, Broadcasting Telematics Data to Nearby Mobile Computing Devices, Vehicles, and Infrastructure, filed Oct. 18, 2017.
U.S. Appl. No. 15/787,305, Determining Abnormal Traffic Conditions From a Broadcast of Telematics Data Originating From Another Vehicle, filed Oct. 18, 2017.
U.S. Appl. No. 15/787,311, Analyzing Telematics Data to Determine Travel Events and Corrective Actions, filed Oct. 18, 2017.
U.S. Appl. No. 15/787,317, Determining Corrective Actions Based Upon Broadcast of Telematics Data Originating From Another Vehicle, filed Oct. 18, 2017.
U.S. Appl. No. 15/798,019, Using Train Telematics Data to Reduce Accident Risk, filed Oct. 30, 2017.
U.S. Appl. No. 15/798,062, Using Train Telematics Data to Provide Information in One or More Vehicles to Reduce Accident Risk, filed Oct. 30, 2017.
U.S. Appl. No. 15/798,093, Using Emergency Response System (EMS) Vehicle Telematics Data to Reduce Accident Risk, filed Oct. 30, 2017.
U.S. Appl. No. 15/798,107, Broadcasting Information Related to Hazards Impacting Vehicle Travel, filed Oct. 30, 2017.
U.S. Appl. filed Aug. 21, 2018, Hayward; Gregory L., U.S. Appl. No. 10/055,982.
US. Appl. filed Aug. 21, 2018, Hayward; Gregory., U.S. Appl. No. 10/054,453.

\* cited by examiner

FACILITATING SAFER VEHICLE TRAVEL UTILIZING TELEMATICS DATA

CROSS REFERENCE TO RELATED APPLICATIONS

The present application is a continuation of, and claims the benefit of, U.S. patent application Ser. No. 16/002,142, filed Jun. 7, 2018 and entitled "Facilitating Safer Vehicle Travel Utilizing Telematics Data," which is a continuation of and claims priority to U.S. patent application Ser. No. 15/860,841 (now U.S. Pat. No. 10,042,364), filed on Jan. 3, 2018 and entitled "Facilitating Safer Vehicle Travel Utilizing Telematics Data," which is a continuation of and claims priority to U.S. patent application Ser. No. 14/990,121, filed on Jan. 7, 2016 (now U.S. Pat. No. 9,904,289), which claims the benefit of (1) U.S. Provisional Patent Application No. 62/105,468, entitled "Broadcasting Telematics Data To Nearby Mobile Computing Devices, Vehicles, And Infrastructure," filed Jan. 20, 2015, (2) U.S. Provisional Patent Application No. 62/113,749, entitled "Broadcasting Telematics Data To Nearby Mobile Computing Devices, Vehicles, And Infrastructure," filed Feb. 9, 2015, (3) U.S. Provisional Patent Application No. 62/204,749, entitled "Broadcasting Telematics Data To Nearby Mobile Computing Devices, Vehicles, And Infrastructure," filed Aug. 13, 2015, (4) U.S. Provisional Patent Application No. 62/207,561, entitled "Generating Alert Notifications By Broadcasting Telematics Data To Nearby Mobile Computing Devices, Vehicles, And Infrastructure," filed Aug. 20, 2015, (5) U.S. Provisional Patent Application No. 62/232,035 entitled "Generating Alert Notifications By Broadcasting Telematics Data To Nearby Mobile Computing Devices, Vehicles, And Infrastructure," filed Sep. 24, 2015, (6) U.S. Provisional Patent Application No. 62/232,045, entitled "Generating Alert Notifications By Broadcasting Telematics Data To Nearby Mobile Computing Devices, Vehicles, And Infrastructure," filed Sep. 24, 2015, (7) U.S. Provisional Patent Application No. 62/232,050, entitled "Determining Abnormal Traffic Conditions From A Broadcast Of Telematics Data Originating From Another Vehicle," filed Sep. 24, 2015, (8) U.S. Provisional Patent Application No. 62/232,054, entitled "Taking Corrective Action Based Upon Telematics Data Broadcast From Another Vehicle," filed Sep. 24, 2015, (9) U.S. Provisional Patent Application No. 62/232,065, entitled "Analyzing Telematics Broadcast To Determine Travel Events And Corrective Actions," filed Sep. 24, 2015, (10) U.S. Provisional Patent Application No. 62/232,075, entitled "Providing Insurance Discounts Based Upon Usage Of Telematics Data-Based Risk Mitigation And Prevention Functionality," filed Sep. 24, 2015, (11) U.S. Provisional Patent Application No. 62/232,083, entitled "Determining Corrective Actions Based Upon Broadcast Of Telematics Data Originating From Another Vehicle," filed Sep. 24, 2015, (12) U.S. Provisional Patent Application No. 62/232,090, entitled "Determining Corrective Actions Based Upon Telematics Data Broadcast From Another Vehicle," filed Sep. 24, 2015, (13) U.S. Provisional Patent Application No. 62/232,097, entitled "Generating Alert Notifications By Broadcasting Train Telematics Data To Nearby Mobile Computing Devices, Vehicles, And Infrastructure," filed Sep. 24, 2015, (14) U.S. Provisional Patent Application No. 62/247,334, entitled "Generating Alert Notifications By Broadcasting Train Telematics Data To Nearby Mobile Computing Devices, Vehicles, And Infrastructure," filed Oct. 28, 2015, and (15) U.S. Provisional Patent Application No. 62/250,286, entitled "Generating Alert Notifications By Broadcasting Train Telematics Data To Nearby Mobile Computing Devices, Vehicles, And Infrastructure," filed Nov. 3, 2015, the disclosure of each of which is hereby expressly incorporated by reference herein in its entirety.

FIELD OF THE DISCLOSURE

The present disclosure generally relates to generating alert notifications and, more particularly, to generating alert notifications based upon an analysis of collected telematics data, which may be used by other drivers

BACKGROUND

Conventional telematics devices may collect certain types of data regarding vehicle operation. However, conventional telematics devices and data gathering techniques may have several drawbacks.

BRIEF SUMMARY

In one aspect, telematics data and/or geographic location data may be collected, monitored, measured, and/or generated by one or more computing devices associated with a vehicle. The telematics data may include various metrics that indicate the direction, speed, and/or motion of the vehicle in which the data is associated. The geographic location data may include a geographic location of the vehicle, such as latitude and longitude coordinates, for example. The one or more computing devices may include a mobile computing device positioned within the vehicle, an on-board computer integrated within the vehicle, and/or a combination of these devices working in conjunction with one another. The one or more computing devices may broadcast the telematics data and/or the geographic location data to one or more other devices.

The telematics data and/or the geographic location data may be received and/or processed by one or more other computing devices to determine whether an anomalous condition exists, such as a traffic accident, for example. These one or more other computing devices may be external computing devices (e.g., a remote server), another mobile computing device, a smart traffic infrastructure device (e.g., a smart traffic light), etc. If an anomalous condition is detected, the geographic location of the vehicle associated with the telematics data may be used as a condition to decide whether to generate an alert at (or send an alert notification to) the one or more other computing devices associated with nearby vehicles.

In one aspect, a computer server (or smart infrastructure) configured to use telematics data associated with a first driver to facilitate safer vehicle travel for a second driver may be provided. The computer server may include (1) a communication unit configured to receive telematics data via wireless communication and/or data transmission, the telematics data being generated and transmitted from a first mobile device and/or first smart vehicle associated with a first driver; (2) a memory unit configured to store vehicle navigation information, virtual road maps, and/or computer-readable instructions; and (3) a processor configured to access the memory unit and to automatically identify or determine: (i) a travel or traffic event associated with the first mobile device and/or first vehicle, (ii) a Global Positioning System (GPS) location or other location of the travel event, and (iii) an estimated or actual geographical or temporal scope of the travel event from computer analysis of the telematics data, the processor further being configured to generate a travel event-related data transmission or wireless communication associated with or detailing the travel event, or location or extent thereof. The communication unit may be further configured to transmit the travel event-related data transmission or wireless communication to a second mobile device or second vehicle associated with the second driver to facilitate the second mobile device or second vehicle taking corrective action to enable safer vehicle travel for the second driver based upon the telematics data associated with the first driver. The remote server may include additional, less, or alternate functionality, including that discussed elsewhere herein.

In another aspect, a smart infrastructure component configured to use telematics data from a first driver to facilitate safer vehicle travel for a second driver may be provided. The smart infrastructure component may include (1) a communication unit configured to receive a data transmission or wireless communication containing or including telematics data, the telematics data being generated and transmitted from a first mobile device or a first vehicle associated with the first driver; (2) a memory unit configured to store vehicle navigation information, virtual road maps, and computer-readable instructions; and (3) a processor configured to access the memory unit to automatically identify or determine: (i) a travel event; (ii) a Global Positioning System (GPS) location or other location of the travel event; and (iii) an estimated or actual geographical or temporal scope of the travel event from computer analysis of the telematics data, the processor further being configured to generate a travel event-related data transmission or wireless communication associated with or detailing the travel event, or location or extent thereof. The communication unit may be further configured to transmit the travel event-related data transmission or wireless communication to a second mobile device and/or second vehicle associated with the second driver to facilitate the second mobile device or second vehicle taking corrective action to enable safer vehicle travel for the second driver based upon the telematics data associated with the first driver. The smart infrastructure component may be configured with additional, less, or alternate functionality, including that discussed elsewhere herein.

In yet another aspect, an intermediate mobile device or smart vehicle configured to use telematics and/or other data from a first driver to facilitate safer vehicle travel for a second driver, the intermediate mobile device or smart vehicle may be provided. The intermediate mobile device or smart vehicle may include (1) a communication unit configured to receive a data transmission or wireless communication containing or including telematics data, the telematics data being generated and transmitted from a first mobile device or first smart vehicle associated with the first driver; (2) a memory unit configured to store vehicle navigation information, virtual road maps, and/or computer-readable instructions; (3) a processor configured to access the memory unit to automatically identify or determine: (i) a travel event; (ii) a Global Positioning System (GPS) location or other location of the travel event; and (iii) an estimated or actual geographical or temporal scope of the travel event from computer analysis of the telematics data, the processor further being configured to generate a travel event-related data transmission or wireless communication associated with or detailing the travel event, or location or extent thereof. The communication unit may be further configured to transmit the travel event-related data transmission or wireless communication to a second or destination mobile device and/or a second smart vehicle associated with the second driver via peer-to-peer (P2P) communication to facilitate the second mobile device or second smart vehicle taking corrective action to enable safer vehicle travel for the second driver based upon the telematics data associated with the first driver. The intermediate mobile device or smart vehicle may be configured with additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
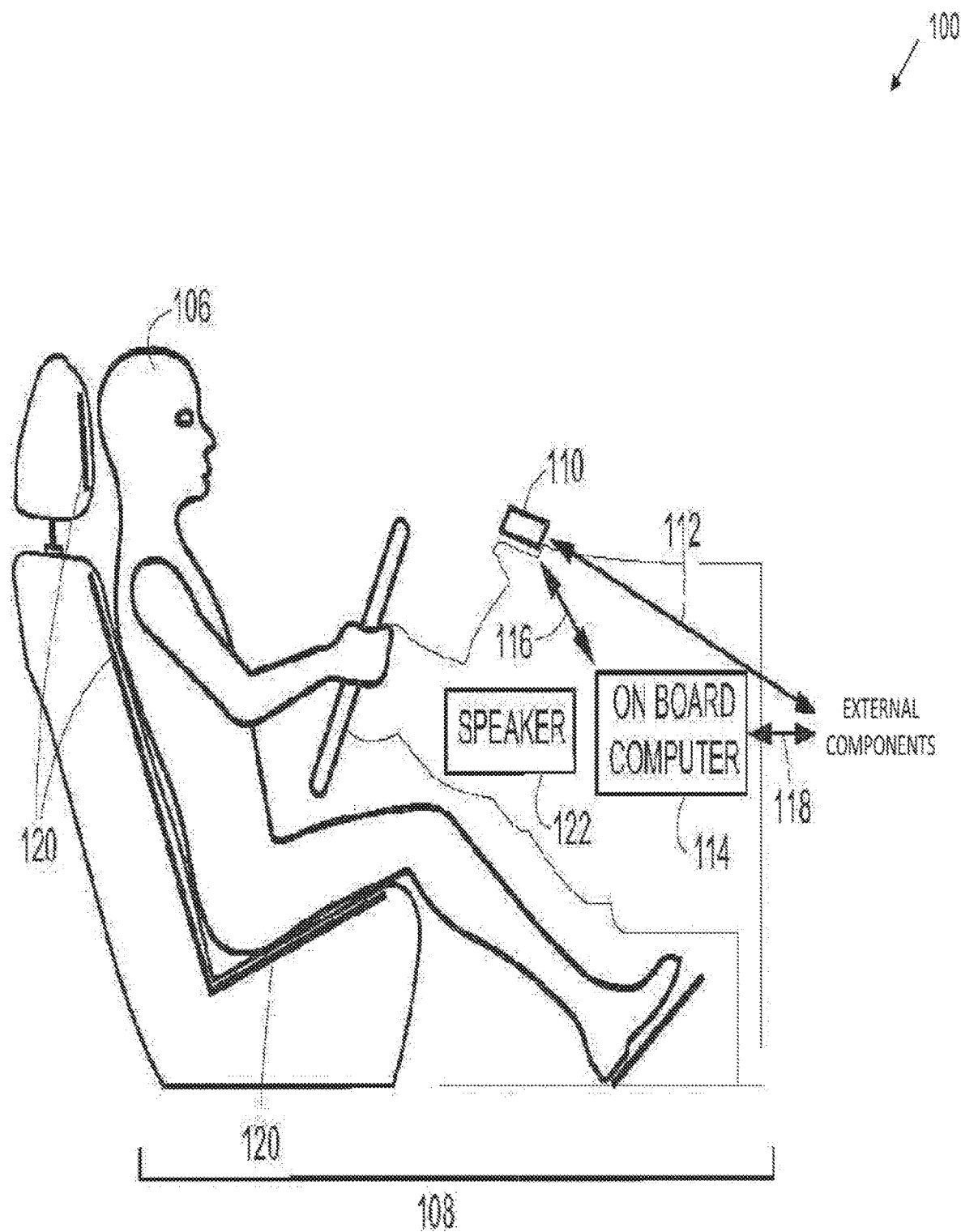
FIG. 1 illustrates a block diagram of an exemplary telematics collection system 100 in accordance with an exemplary aspect of the present disclosure.

The Figures depict preferred embodiments for purposes of illustration only. Alternative embodiments of the systems and methods illustrated herein may be employed without departing from the principles of the invention described herein.

DETAILED DESCRIPTION

The present embodiments relate to, inter alia, determining whether an anomalous condition is detected at the location of a vehicle using one or more computing devices within or otherwise associated with the vehicle. If the detected anomalous condition may impact or affect another vehicle on the road, embodiments are described to generate and/or send alert notifications to other vehicles that may be so affected. As further described throughout the disclosure, the process of detecting anomalous conditions and whether they apply to other vehicles may be performed through an analysis geographic location data and/or telematics data broadcasted from one or more computing devices within or otherwise associated with one or more respective vehicles.

The present embodiments may relate to collecting, transmitting, and/or receiving telematics data; and may include a mobile device, a vehicle-mounted processor, computer server, web pages, applications, software modules, user interfaces, interactive display screens, memory units, and/or other electronic, electrical, and/or wireless communication equipment configured to provide the functionality discussed herein. As compared with the prior art, the present embodiments include specifically configured computing equipment that provide for an enhanced method of collecting telematics and/or other vehicle/driving conditions related data, and performing certain actions based upon the data collected. Using the telematics and/or other data collected, in conjunction with the novel techniques discussed herein, recommendations and/or travel/driving guidance may be provided to remote vehicles and/or drivers.

The present embodiments may solve one or more technical problems related to (1) vehicle safety, and/or (2) vehicle navigation by using solutions or improvements in another technological field, namely telematics. Vehicle safety and vehicle navigation is often impacted by short-term traffic events that occur with little or no warning. For instance, vehicle accidents may be caused by road construction, other vehicle accidents, traffic being temporarily re-routed, unexpected bad weather, other drivers or vehicles, etc.

To address these and other problems, telematics data (and/or driver behavior or vehicle information) may be captured in real-time, or near real-time, by a mobile device of a vehicle driver (or passenger). The mobile device may be specifically configured for gathering, collecting, and/or generating telematics and/or other data as a vehicle is traveling.

For instance, the mobile device may be equipped with (i) various sensors and/or meters capable of generating telematics data (GPS unit, speed sensor, speedometer, odometer, gyroscope, compass, accelerometer, etc.) and/or (ii) an application, such as a Telematics Data Application or Telematics "App," that includes computer instructions and/or software modules stored in a non-transitory memory unit that control collecting and generating telematics and/or other data. The mobile device and/or the application (or Telematics App) may provide a software module, user interface, and/or interactive display screen configured to facilitate the data collection. The mobile device and/or Telematics App executing thereon may be configured to prepare or otherwise format the telematics and/or other data collected or generated for transmission (via wireless communication and/or data transmission) to a mobile device of a second driver, a remote server, another (smart) vehicle, and/or smart infrastructure—all of which may be equipped with its own Telematics App or other telematics related applications. The Telematics App may include other functionality, including the mobile device functionality discussed elsewhere herein.

Alternatively, the mobile device may remotely access a web page, such as via wireless communication with a remote server. The web page may provide the mobile device with the functionality to collect the telematics and/or other data as the vehicle is moving. Additionally or alternatively, the web page may allow the mobile device to upload or transmit data in real-time, or near real-time, to a mobile device of a second driver, a remote server, smart infrastructure, and/or another (smart) vehicle.

Additionally or alternatively, a smart vehicle controller or processor may be configured with the same functionality as that of the mobile device described above. For instance, a smart vehicle controller may include an application, software module, or computer instructions that provide for the telematics and/or other data collection and generation functionality discussed herein. The smart vehicle controller may be in wired or wireless communication with various ("smart" or "dumb") vehicle-mounted meters, sensors, and/or detectors, such as speedometers, speed sensors, compasses, gyros, accelerometers, etc. that collect and/or generate telematics data and/or other data detailing or associated with vehicle operation, and/or driving or driver behavior.

In one aspect, by solving problems with collecting telematics data and/or other data associated with driver behavior and/or vehicle operation or performance, problems with vehicle navigation and/or vehicle operation may be resolved. For instance, telematics data associated with a first vehicle may be collected in real-time by a mobile device of a first driver. The mobile device may be specifically configured to gather or generate telematics and/or other driver/vehicle data in real-time as the vehicle is traveling, such as via a Telematics App running on the mobile device. If a traffic event is encountered, about to be encountered, and/or expected or anticipated to be encountered by the vehicle as it travels (e.g., road construction; heavy traffic; congestion; bad weather conditions: unlawful, unexpected or erratic operation of other vehicles; questionable or abnormal driving behavior of other drivers; irresponsible or overly aggressive drivers; un-attentive or tired drivers, etc.), the telematics (and/or data) data collected may indicate such.

The mobile device itself (and/or Telematics App) may be configured to identify the type of traffic event and transmit the type of traffic event to other mobile devices, a remote server, smart vehicles, and/or smart infrastructure. In one embodiment, the mobile device (and/or Telematics App) may be in wireless communication with a smart vehicle control system of the vehicle, and the smart vehicle control system may transmit the telematics and/or other data, and/or any associated warnings, to a remote server, and/or roadside smart infrastructure or nearby mobile device or vehicles of other drivers (such as to conserve battery power of the mobile device).

Alternatively, the mobile device (and/or Telematics App) may transmit the telematics and/or other data collected via wireless communication and/or data transmission to a second computing device—such as a second mobile device (or another driver), a second and smart vehicle, a remote server, and/or road side infrastructure (smart street signs or road posts, smart toll booths, etc.). After which, the second and remote computing device may analyze the telematics and/or other data that is collected in real-time, or near real-time, to determine traffic events in real-time, or near real-time, respectively. Based upon the type and extent of traffic event detected, the second computing device may issue warnings, determine recommendations, and/or re-route vehicles. For instance, the second computing device may cause a display screen or user interface of a mobile device or smart vehicle controller of remote drivers to display a map with (1) a current route that the vehicle is on, (2) a virtual representation of the traffic event, and/or (3) an alternate or recommended new route to an original destination that avoids the traffic event.

In one embodiment, a telematics application or software module (e.g., the Telematics App as discussed herein) may be designed to communicate with smart vehicles and smart infrastructure. An advantage of this is that for a vehicle owner that does not have a "smart" vehicle with wireless communication technology, the application and/or software module deployed on a smart phone or other mobile device may communicate with smart vehicles and infrastructure (and/or remote servers and other mobile devices). The telematics application and/or software module may be programmed to provide voice alerts: such as on a two lane road "do not pass-a vehicle is approaching" or "high speed vehicle is approaching to your left (or right);" "traffic light will turn in 10 seconds;" "turn left to find an open parking space;" "traffic is stopped 1.5 miles ahead;" "traffic has slowed to 20 mph 1.5 miles (or 2 blocks) ahead;" "recommended speed for turn ahead is 30 mph;" and/or "ice on bridge (or ramp) ahead."

As an example, a first mobile device may be traveling in a vehicle. The first mobile device may collect telematics data and/or other data, such as via a telematics application running on one or more processors mounted within the first mobile device. The first mobile device (and/or the telematics application) may detect a travel event from the data collected. For instance, the first mobile device (and/or the telematics application executing thereon) may determine that the vehicle is located on the highway, but the vehicle is moving slower than the posted speed limit. The first mobile device (and/or the telematics application) may then transmit the data collected and/or an associated message via wireless communication or data transmission to smart roadside infrastructure and/or nearby vehicles (or a second mobile device traveling within a nearby and second vehicle). The second mobile device (and/or a telematics application running thereon) may then, using the data received and/or message received from the first mobile device, generate an audible or visual warning or alert of the travel event, such as "Warning, congestion ahead," and/or "Recommend taking Exit 10 and traveling on Highway 12 for 5 miles until Exit 11 to avoid the congestion ahead." The second mobile device (and/or associated telematics application) may also be able to compare locations of the travel event with the current location of the second vehicle to determine if the travel event poses a potential obstacle to the second vehicle reaching its destination without interruption. Thus, the telematics data collected using a first mobile device (and/or a telematics application) and associated with a first driver may be used to alert a second driver (associated with the second mobile device) of a travel event and/or re-route the second vehicle to facilitate safer vehicle travel for the second driver and vehicle.

In one aspect, a mobile device (and/or the telematics application) may compare a vehicle's traveling speed with a known posted speed limit. If the vehicle's speed is below or above the posted speed by a certain threshold, for example, 10 or 20 miles-per-hour, then the mobile device may generate a warning and transmit the warning to roadside infrastructure and/or nearby mobile devices or vehicles. For example, the message may state "Slow moving vehicle in right hand lane ahead;" "High speed vehicle approaching from rear;" And/or "High speed vehicle approaching from ahead."

Other messages or alerts that may be generated from mobile devices (and/or telematics applications executing thereon), smart vehicle controllers, remote servers, and/or smart infrastructure and transmitted to a mobile device of a driver (and/or smart vehicle) may include "Construction 1 mile ahead;" "Rain (or Snow) 5 miles ahead;" "Detour 2 blocks ahead;" "Traffic light directly ahead will change from Green to Red starting in 5 seconds;" "Stranded vehicle on right side of road half a mile ahead;" "Recommend turning right at next intersection to avoid travel event 3 blocks ahead;" and/or other travel or traffic event-related messages.

An insurance provider may collect an insured's usage of the vehicle safety functionality provided herein, such as at an insurance provider remote server and/or via a mobile device application. Based upon an individual's usage and/or taking travel recommendations, such as travel recommendations that reduce or lower risk and/or enhance driver or vehicle safety, insurance policies (such as vehicle or life insurance policies) may be adjusted, generated, and/or updated. The insurance provider remote server may calculate, update, and/or adjust insurance premiums, rates, discounts, points, programs, etc., such as adjusting an insurance discount or premium based upon the insured having the functionality discussed herein and/or the amount that the insured uses the functionality discussed herein. The updated insurance policies (and/or premiums, rates, discounts, etc.) may be communicated to insurance customers for their review, modification, and/or approval—such as via wireless communication or data transmission from a remote server to a mobile device or the insured.

Telematics and Vehicle Navigation

In one aspect, by solving problems with collecting telematics data and/or other data associated with driver behavior and/or vehicle operation or performance, problems with vehicle navigation and/or vehicle operation may be resolved. For instance, telematics data associated with a first vehicle may be collected in real-time by a mobile device of a first driver. The mobile device may be specifically configured to gather or generate telematics and/or other driver/vehicle data in real-time as the vehicle is traveling. If a traffic event is encountered, about to be encountered, and/or expected or anticipated to be encountered by the vehicle as it travels (e.g., road construction; heavy traffic; congestion; bad weather conditions; unlawful, unexpected or erratic operation of other vehicles; questionable or abnormal driving behavior of other drivers; irresponsible or overly aggressive drivers; un-attentive or tired drivers, etc.), the telematics (and/or data) data collected may indicate such.

The mobile device itself may be configured to identify the type of traffic event and transmit the type of traffic event to other mobile devices, a remote server, smart vehicles, and/or smart infrastructure. In one embodiment, the mobile device may be in wireless communication with a smart vehicle control system of the vehicle, and the smart vehicle control system may transmit the telematics and/or other data, and/or any associated warnings, to a remote server, and/or roadside smart infrastructure or nearby mobile device or vehicles of other drivers (such as to conserve battery power of the mobile device).

Additionally or alternatively, the mobile device may transmit the telematics and/or other data collected via wireless communication and/or data transmission to a second computing device—such as a second mobile device (or another driver), a second and smart vehicle, a remote server, and/or road side infrastructure (smart street signs or road posts, smart toll booths, etc.). After which, the second and remote computing device may analyze the telematics and/or other data that is collected in real-time, or near real-time, to determine traffic events in real-time, or near real-time, respectively. Based upon the type and extent of traffic event detected, the second computing device may issue warnings, determine recommendations, and/or re-route vehicles. For instance, the second computing device may cause a display screen or user interface of a mobile device or smart vehicle controller of remote drivers to display a map with (1) a current route that the vehicle is on, (2) a virtual representation of the traffic event, and/or (3) an alternate or recommended new route to an original destination that avoids the traffic event.

Exemplary Telematics Collection System

FIG. 1 illustrates a block diagram of an exemplary telematics collection system 100 in accordance with an exemplary aspect of the present disclosure. In some aspects, telematics collection system 100 may include hardware and software applications configured to measure, calculate, generate, and/or collect geographic location data and/or telematics data indicative of the speed, direction, and/or motion of vehicle 108. Additionally or alternatively, telematics collection system 100 may include hardware and software applications configured to receive and process geographic location data and/or telematics data sent from another telematics collection system, to determine whether an anomalous condition has been detected, whether to generate an alert, and/or whether to send an alert notification or other telematics-rated message. Telematics collection system 100 may include various data communication channels for facilitating data communications between the various hardware and software components and/or communications with one or more external components.

Various references are made to "telematics data" throughout this disclosure. As discussed herein, the telematics data may include any suitable type of information that may be used to identify various anomalous conditions, events, inconveniences, hazards, etc. Examples of telematics data provided herein may include, but is not limited to, data including sensor metrics or other information (e.g., image and/or video data) generated, collected, measured, and/or transmitted from an originating device, which may be indicative of various physical properties, conditions, the environment, and/or other information associated with the originating device.

For example, the telematics data may indicate acceleration, deceleration, Global Positioning System (GPS) location, time, braking, data indicative of an originating vehicle turning, the heading and/or speed of the originating vehicle (e.g., GPS-determined speed, onboard vehicle sensor based speed, etc.) GPS latitude and longitude, a battery level of an originating mobile device located in the originating vehicle, telephone usage information associated with the originating device, angular velocity metrics and/or gyroscope data, current road lane information associated with the originating vehicle, etc.

To accomplish this, telematics collection system 100 may include any suitable number of computing devices, such as mobile computing device 110 and/or on-board computing device 114, for example. These computing devices may be disposed within vehicle 108, permanently installed in vehicle 108, or removably installed in vehicle 108.

In the present aspects, mobile computing device 110 may be implemented as any suitable computing or mobile device, such as a mobile device (e.g., smartphone, tablet, laptop, wearable electronics, phablet, pager, personal digital assistant (PDA), smart glasses, smart watch or bracelet, etc.), while on-board computer may implemented as a general-use on-board computer or processor(s) installed by the manufacturer of vehicle 108 or as an aftermarket modification to vehicle 108, for example. In various aspects, mobile computing device 110 and/or on-board computer 114 may be a thin-client device configured to outsource any suitable portion of processing via communications with one or more external components.

On-board computer 114 may supplement one or more functions performed by mobile computing device 110 described herein by, for example, sending information to and/or receiving information from mobile computing device 110. Mobile computing device 110 and/or on-board computer 114 may communicate with one or more external components via links 112 and 118, respectively. Additionally, mobile computing device 110 and on-board computer 114 may communicate with one another directly via link 116.

In one aspect, mobile computing device 110 may be configured with suitable hardware and/or software (e.g., one or more applications, programs, files, etc.) to determine a geographic location of mobile computing device 110 and, hence, vehicle 108, in which it is positioned. Additionally or alternatively, mobile computing device 110 may be configured with suitable hardware and/or software to monitor, measure, generate, and/or collect one or more sensor metrics as part of the telematics data. Mobile computing device 110 may be configured to broadcast the geographic location data and/or the one or more sensor metrics to one or more external components.

In some aspects, the external components may include another mobile computing device substantially similar to or identical to mobile computing device 110. In accordance with such aspects, mobile computing device 110 may additionally or alternatively be configured to receive geographic location data and/or sensor metrics broadcasted from another mobile computing device, the details of which are further discussed below. Mobile computing device 110 may be configured to determine, upon receiving the geographic location data and/or sensor metrics, whether an anomalous condition exists at the geographic location indicated by the geographic location data. If so, mobile computing device 110 may be configured to generate one or more audio and/or video alerts indicative of the determined anomalous condition.

On-board computer 114 may be configured to perform one or more functions otherwise performed by mobile computing device 110. However, on-board computer 114 may additionally be configured to obtain geographic location data and/or telematics data by communicating with one or more vehicle sensors that are integrated into vehicle 108. For example, on-board computer 114 may obtain geographic location data via communication with a vehicle-integrated global navigation satellite system (GNSS). To provide additional examples, on-board computer 114 may obtain one or more metrics related to the speed, direction, and/or motion of vehicle 108 via any number of suitable sensors, such as speedometer sensors, braking sensors, airbag deployment sensors, crash detection sensors, etc.

In one aspect, mobile computing device 110 and/or on-board computer 114 may operate independently of one another to generate geographic location data and/or telematics data, to receive geographic location data and/or telematics data broadcasted from another telematics collection system, to determine whether to generate one or more alerts, and/or to generate one or more alert notifications. In accordance with such aspects, telematics collection system 100 may include mobile computing device 110 but not on-board computer 114, and vice-versa.

In other aspects, mobile computing device 110 and/or on-board computer 114 may operate in conjunction with one another to generate geographic location data and/or telematics data, to receive geographic location data and/or telematics data broadcasted from another telematics collection system, to determine whether to generate one or more alerts, and to generate one or more alert notifications. In accordance with such aspects, telematics collection system 100 may include both mobile computing device 110 and on-board computer 114. Mobile computing device 110 and on-board computer 114 may share any suitable portion of processing between one another to facilitate the functionality described herein.

Upon receiving notification alerts from another telematics collection system, aspects include telematics collection system 100 generating alerts via any suitable audio, video, and/or tactile techniques. For example, alerts may be generated via a display implemented by mobile computing device 110 and/or on-board computer 114. To provide another example, a tactile alert system 120 (e.g., a seat that can vibrate) may be configured to generate tactile alerts to a vehicle operator 106 when commanded by mobile computing device 110 and/or on-board computer 114. To provide another example, audible alerts may be generated via a speaker 122, which may be part of vehicle 108's integrated speaker system, for example.

Although telematics collection system 100 is shown in FIG. 1 as including one mobile computing device 110 and one on-board computer 114, various aspects include telematics collection system 100 implementing any suitable number of mobile computing devices 110 and/or on-board computers 114.

Exemplary Telematics Alert Notification System

Figure 2:
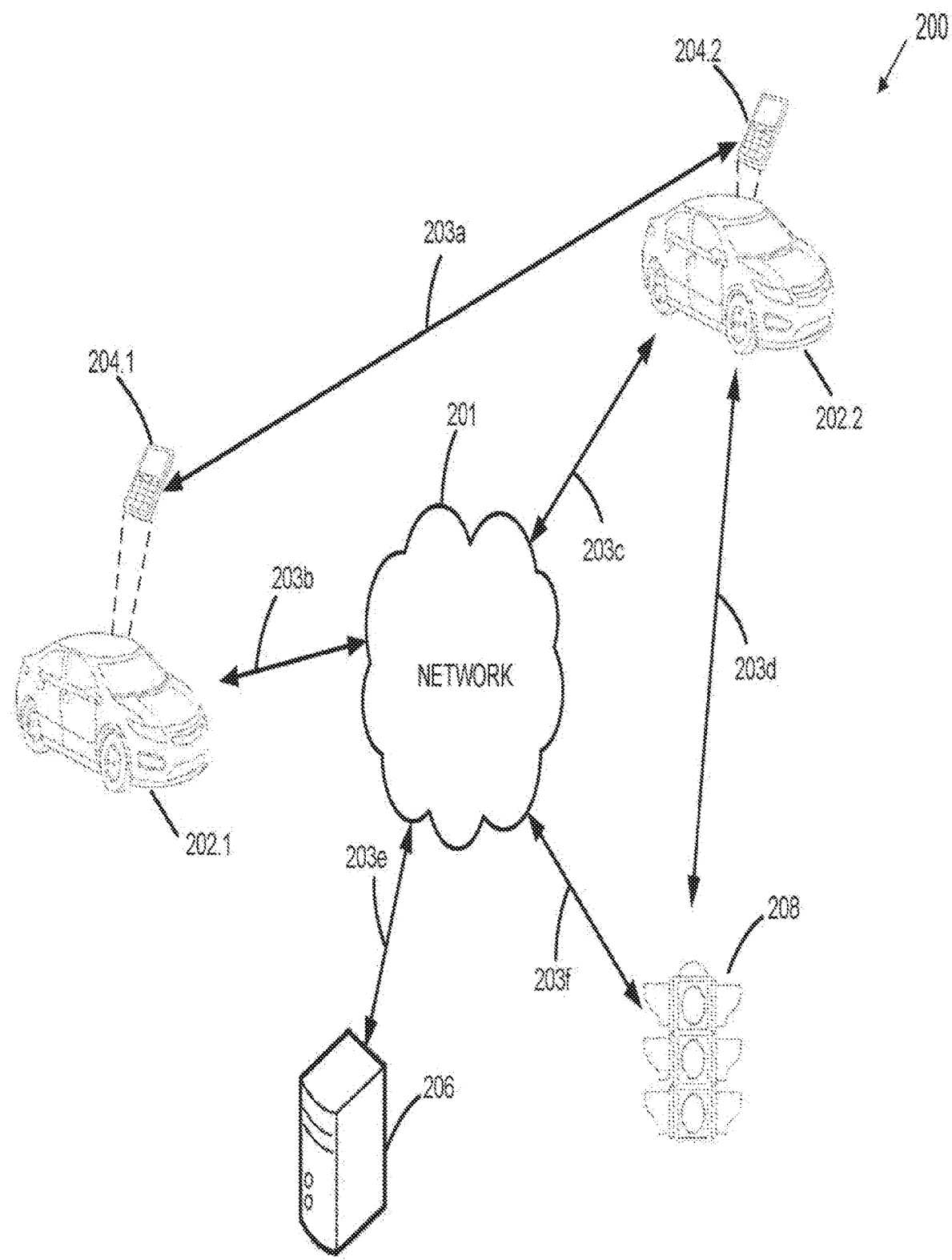
FIG. 2 illustrates a block diagram of an exemplary alert notification system 200 in accordance with an exemplary aspect of the present disclosure.

FIG. 2 illustrates a block diagram of an exemplary alert notification system 200 in accordance with an exemplary aspect of the present disclosure. In one aspect, alert notification system 200 may include a network 201, N number of vehicles 202.1-202.N and respective mobile computing devices 204.1-204.N, an external computing device 206, and/or an infrastructure component 208. In one aspect, mobile computing devices 204 may be an implementation of mobile computing device 110, as shown in FIG. 1, while vehicles 202 may be an implementation of vehicle 108, also shown in FIG. 1. Each of vehicles 202.1 and 202.2 may have an associated on-board computer, which is not shown in FIG. 2 for purposes of brevity, but may be an implementation of on-board computer 114, as shown in FIG. 1. Each of vehicles 202.1 and 202.2 may be configured for wireless inter-vehicle communication, such as vehicle-to-vehicle (V2V) wireless communication and/or data transmission.

Although alert notification system 200 is shown in FIG. 2 as including one network 201, two mobile computing devices 204.1 and 204.2, two vehicles 202.1 and 202.2, one external computing device 206, and/or one infrastructure component 208, various aspects include alert notification system 200 implementing any suitable number of networks 201, mobile computing devices 204, vehicles 202, external computing devices 206, and/or infrastructure components 208. For example, alert notification system 200 may include a plurality of external computing devices 206 and more than two mobile computing devices 204, any suitable number of which being interconnected directly to one another and/or via network 201.

In one aspect, each of mobile computing devices 204.1 and 204.2 may be configured to communicate with one another directly via peer-to-peer (P2P) wireless communication and/or data transfer. In other aspects, each of mobile computing devices 204.1 and 204.2 may be configured to communicate indirectly with one another and/or any suitable device via communications over network 201, such as external computing device 206 and/or infrastructure component 208, for example. In still other aspects, each of mobile computing devices 204.1 and 204.2 may be configured to communicate directly and indirectly with one and/or any suitable device, which may be concurrent communications or communications occurring at separate times.

Each of mobile computing devices 204.1 and 204.2 may be configured to send data to and/or receive data from one another and/or via network 201 using one or more suitable communication protocols, which may be the same communication protocols or different communication protocols as one another. To provide an example, mobile computing devices 204.1 and 204.2 may be configured to communicate with one another via a direct radio link 203a, which may utilize, for example, a Wi-Fi direct protocol, an ad-hoc cellular communication protocol, etc. Furthermore, mobile computing devices 204.1 and 204.2 may be configured to communicate with the vehicle on-board computers located in vehicles 202.1 and 202.1, respectively, utilizing a BLUETOOTH communication protocol (radio link not shown).

To provide additional examples, mobile computing devices 204.1 and 204.2 may be configured to communicate with one another via radio links 203b and 203c by each communicating with network 201 utilizing a cellular communication protocol. As an additional example, mobile computing devices 204.1 and/or 204.2 may be configured to communicate with external computing device 206 via radio links 203b, 203c, and/or 203e. Still further, one or more of mobile computing devices 204.1 and/or 204.2 may also be configured to communicate with one or more smart infrastructure components 208 directly (e.g., via radio link 203d) and/or indirectly (e.g., via radio links 203c and 203f via network 201) using any suitable communication protocols.

Mobile computing devices 204.1 and 204.2 may be configured to execute one or more algorithms, programs, applications, etc., to determine a geographic location of each respective mobile computing device (and thus their associated vehicle) to generate, measure, monitor, and/or collect one or more sensor metrics as telematics data, to broadcast the geographic data and/or telematics data via their respective radio links, to receive the geographic data and/or telematics data via their respective radio links, to determine whether an alert should be generated based upon the telematics data and/or the geographic location data, to generate the one or more alerts, and/or to broadcast one or more alert notifications.

Network 201 may be implemented as any suitable network configured to facilitate communications between mobile computing devices 204.1 and/or 204.2 and one or more of external computing device 206 and/or infrastructure component 208. For example, network 201 may include one or more telecommunication networks, nodes, and/or links used to facilitate data exchanges between one or more devices, and may facilitate a connection to the Internet for devices configured to communicate with network 201. Network 201 may include any suitable number of interconnected network components that form an aggregate network system, such as dedicated access lines, plain ordinary telephone lines, satellite links, cellular base stations, a public switched telephone network (PSTN), etc., or any suitable combination thereof. Network 201 may include, for example, a proprietary network, a secure public internet, a mobile-based network, a virtual private network, etc.

In aspects in which network 201 facilitates a connection to the Internet, data communications may take place over the network 201 via one or more suitable Internet communication protocols. For example, network 201 may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 203a-203f may represent wired links, wireless links, or any suitable combination thereof.

In aspects in which mobile computing devices 204.1 and 204.2 communicate directly with one another in a peer-to-peer fashion, network 201 may be bypassed and thus communications between mobile computing devices 204.1 and 204.2 and external computing device 206 may be unnecessary. For example, in some aspects, mobile computing device 204.1 may broadcast geographic location data and/or telematics data directly to mobile computing device 204.2. In this case, mobile computing device 204.2 may operate independently of network 201 to determine whether an alert should be generated at mobile computing device 204.2 based upon the geographic location data and the telematics data. In accordance with such aspects, network 201 and external computing device 206 may be omitted.

However, in other aspects, one or more of mobile computing devices 204.1 and/or 204.2 may work in conjunction with external computing device 206 to generate alerts. For example, in some aspects, mobile computing device 204.1 may broadcast geographic location data and/or telematics data, which is received by external computing device 206. In this case, external computing device 206 may be configured to determine whether an alert should be sent to mobile computing device 204.2 based upon the geographic location data and the telematics data.

External computing device 206 may be configured to execute various software applications, algorithms, and/or other suitable programs. External computing device 206 may be implemented as any suitable type of device to facilitate the functionality as described herein. For example, external computing device 206 may be implemented as a network server, a web-server, a database server, one or more databases and/or storage devices, or any suitable combination thereof. Although illustrated as a single device in FIG. 2, one or more portions of external computing device 206 may be implemented as one or more storage devices that are physically co-located with external computing device 206, or as one or more storage devices utilizing different storage locations as a shared database structure (e.g. cloud storage).

In some embodiments, external computing device 206 may be configured to perform any suitable portion of the processing functions remotely that have been outsourced by one or more of mobile computing devices 204.1 and/or 204.2. For example, mobile computing device 204.1 and/or 204.2 may collect data (e.g., geographic location data and/or telematics data) as described herein, but may send the data to external computing device 206 for remote processing instead of processing the data locally. In such embodiments, external computing device 206 may receive and process the data to determine whether an anomalous condition exists and, if so, whether to send an alert notification to one or more mobile computing devices 204.1 and 204.2.

In one aspect, external computing device 206 may additionally or alternatively be part of an insurer computing system (or facilitate communications with an insurer computer system), and as such may access insurer databases, execute algorithms, execute applications, access remote servers, communicate with remote processors, etc., as needed to perform insurance-related functions. For example, external computing device 206 may facilitate the receipt of telematics data or other data from one or more mobile computing devices 204.1-204.N and/or one or more vehicles 202.1-202.N, which may be associated with insurance customers and/or running a Telematics App, as further discussed below with reference to FIG. 3.

In aspects in which external computing device 206 facilitates communications with an insurer computing system (or is part of such a system), data received from one or more mobile computing devices 204.1-204.N and/or one or more vehicles 202.1-202.N may include logon credentials which may be verified by external computing device 206 or one or more other external computing devices, servers, etc. These logon credentials may be associated with an insurer profile, which may include, for example, insurance policy numbers or other insurance policy information, a description and/or listing of insured assets, vehicle identification numbers of insured vehicles, addresses of insured structures, contact information, premium rates, discounts, etc.

In this way, data received from one or more mobile computing devices 204.1-204.N and/or one or more vehicles 202.1-202.N may allow external computing device 206 to uniquely identify each insured customer and/or whether each identified insurance customer has installed the Telematics App. Furthermore, any data collected from one or more mobile computing devices 204.1-204.N may be referenced to each insurance customer and/or any insurance policies associated with each insurance customer for various insurance-related purposes.

For example, as further discussed below with reference to FIGS. 3 and 5, the one or more mobile computing devices 204.1-204.N and/or one or more vehicles 202.1-202.N may broadcast, in addition to or as part of the telematics data, data indicative of whether a Telematics App has been installed and/or usage data indicative of how often a driver uses the functionality associated with the Telematics App while driving. That is, similar or identical data may be received from a vehicle as opposed to the mobile computing device located in the vehicle. In this way, the same functions discussed below with reference to FIG. 3 regarding the Telematics App installed and executed on a mobile computing device may also (or alternatively) be installed and executed as part of a vehicle's integrated computer functions, as previously discussed with reference to FIG. 1 above and further discussed with reference to FIG. 5 below.

In various aspects, an insurer may leverage data regarding whether an insured customer has installed a Telematics App or how often the Telematics App is used while driving to calculate, adjust, and/or update various insurance pricing for an automotive insurance policy or other suitable insurance policy. For example, an insurer may adjust insurance premiums, rates, discounts, points, programs, etc., based upon the insured having the functionality discussed herein and/or the amount that the insured uses the functionality discussed herein.

In addition, external computing device 206 may facilitate the communication of the updated insurance policies, premiums, rates, discounts, etc., to insurance customers for their review, modification, and/or approval—such as via wireless communication or data transmission to one or more mobile computing devices 204.1-204.N and/or one or more vehicles 202.1-202.N. For example, an insurer may provide an initial discount for an insured customer installing the Telematics App and logging in with the Telematics App. To continue this example, because the alert notifications provided by the Telematics App may reduce the likelihood of a collision or other damage occurring to the vehicle or the driver, use of the Telematics App may function to mitigate or prevent driving risks upon which an insurance policy is partially based. Therefore, an insurer may provide an additional discount that increases with the insured customer's usage of the Telematics App while driving.

In some aspects, any of mobile computing devices 204.1-204.N, vehicles 202.1-202.N, external computing device 206, and/or infrastructure component 208 may facilitate indirect communications between one or more other mobile computing devices 204.1-204.2, vehicles 202.1-202.N, external computing device 206, and/or infrastructure component 208 via network 201 or another suitable communication network and/or wireless link. For example, external computing device 206 may function as an intermediary device, receiving telematics data from an originating mobile device 204.1 via radio link 203b and relaying the telematics data to a destination mobile computing device 204.2 and/or to vehicle 202.2 via radio link 203c.

Infrastructure component 208 may be implemented as any suitable type of traffic infrastructure component configured to receive communications from and/or to send communications to other devices, such as mobile computing devices 204.1, 204.2 and/or external computing device 206, for example. For example, infrastructure component 208 may be implemented as a traffic light, a railroad crossing light, a construction notification sign, a roadside display configured to display messages, an electronic toll booth, a billboard display, etc.

In some aspects, infrastructure component 208 may be implemented as one or more "smart" infrastructure components, which may be configured to communicate with one or more other devices directly and/or indirectly. Examples of smart infrastructure components may include, for example, smart stop signs, smart street signs, smart toll booths, smart road-side equipment, smart markers, smart reflectors, smart billboard displays, etc. To provide an illustrative example, infrastructure component 208 may be configured to communicate directly with mobile computing device 204.2 via link 203.d and/or with mobile computing device 204.1 via links 203b and 203f utilizing network 201. To provide another illustrative example, infrastructure component 208 may communicate with external computing device 206 via links 203e and 203f utilizing network 201.

As discussed above, one or more infrastructure components 208 may facilitate indirect communications between one or more of mobile computing devices 204.1-204.N, vehicles 202.1-202.N, and/or external computing device 206 via network 201 or another suitable communication network and/or wireless link. For example, one or more infrastructure components 208 may function as an intermediary device, receiving telematics data from an originating mobile computing device 204.2 and/or vehicle 202.2 via radio link 203d and relaying the telematics data to a destination mobile computing device 204.1 and/or to vehicle 202.1 via radio links 203b and 203f.

In some aspects, infrastructure component 208 may be configured to receive geographic location data and/or telematics data from one or more other devices and to process this data to determine whether an anomalous condition has been detected and whether the detected anomalous condition satisfies a threshold distance condition with respect to infrastructure component 208. The threshold distance condition may include, for example, the geographic location of the anomalous condition being within a threshold radius of infrastructure component 208, on the same road serviced by infrastructure component 208, etc. If so, infrastructure component 208 may perform one or more relevant actions such as displaying one or more relevant messages to notify drivers in the vicinity, to modify traffic patterns, to change traffic light timing, to redirect traffic, etc.

In other aspects, infrastructure component 208 may receive data indicating that an alert is to be generated and/or the type of alert that is to be generated. In accordance with such aspects, one or more of mobile computing devices 204.1, 204.2 and/or external computing device 206 may make the determination of whether an anomalous condition exists and is within a threshold distance of infrastructure component 208. If so, the data received by infrastructure component 208 may be indicative of the type of anomalous condition, the location of the anomalous condition, commands to cause infrastructure component 208 to perform one or more acts, the type of acts to perform, etc.

To provide some illustrative examples, if infrastructure component 208 is implemented as a smart traffic light, infrastructure component 208 may change a traffic light from green to red (or vice-versa) or adjust a timing cycle to favor traffic in one direction over another. To provide another example, if infrastructure component 208 is implemented as a traffic sign display, infrastructure component 208 may display a warning message that the anomalous condition (e.g., a traffic accident) has been detected ahead and/or on a specific road corresponding to the geographic location data.

In additional aspects, other vehicles may play a role in the one or more alert notifications. To provide an illustrative example, an emergency vehicle (e.g., an ambulance, fire truck, etc.) may be dispatched to the scene of an accident. In such a case, the emergency vehicle may be configured to broadcast one or more signals that cause one or more of mobile computing devices 204.1-204.2 to generate one or more alert notifications and/or infrastructure component 208 to change to a different state. These signals may be broadcasted from a mobile computing device carried by emergency response personnel and triggered upon the vehicle approaching (e.g., within a threshold distance) a geographic location associated the vehicle accident. Additionally or alternatively, the signals may be broadcasted by any suitable device mounted in or otherwise associated with the emergency response vehicle.

To provide another illustrative example, a train may broadcast one or more signals indicating that the train is approaching a railroad crossing, which is received by one or more of mobile computing devices 204.1-204.2 and/or infrastructure component 208 and results in the mobile computing devices generating one or more alert notifications and/or the infrastructure component 208 changing to a different state. Similar to the emergency vehicle example above, the broadcasted signal may be transmitted upon the train approaching (e.g., within a threshold distance) of the crossing location, and may be transmitted from a mobile computing device and/or equipment mounted on or otherwise associated with the train.

Additional vehicles such as emergency response vehicles and trains are not illustrated in FIG. 2 for purposes of brevity. However, the signals transmitted from these vehicles may be transmitted in accordance with any suitable communication protocol directly and/or indirectly to one or more or mobile computing devices 204.1-204.2 and/or infrastructure component 208. For example, the signals may be transmitted to directly to infrastructure component 208, indirectly to one more mobile computing devices 204.1-204.2 via network 201 and/or remote computing device 206, etc.

Exemplary End-User/Destination Devices

The following details regarding the determination of an anomalous condition are explained in this section with reference to computing device 300, which may be a mobile computing device or "mobile device" (e.g., smart phone, laptop, tablet, phablet, smart watch, wearable electronics, etc.). In the present aspect, computing device 300 may be implemented as any suitable computing device, such as a mobile computing device (e.g., mobile computing device 100, as shown in Figure 1and/or one of mobile computing devices 204.1-204.N, as shown in FIG. 2). In another aspect, computing device 300 may be implemented as an on-board vehicle computer (e.g., on-board vehicle computer 114, as shown in FIG. 1). In still other aspects, computing device 300 may be implemented as a device external to a vehicle (e.g., remote computing device 206 or infrastructure component 208, as shown in FIG. 2).

In aspects in which computing device 300 is associated with a vehicle (e.g., a mobile computing device located in a vehicle or integrated as part of the vehicle itself) computing device 300 may be associated with a driver of the vehicle. In some instances, the driver may drive the vehicle, while in other aspects the vehicle may perform autonomous or semi-autonomous driving functions, which are further discussed below with reference to FIG. 5. In any event, when an anomalous condition (e.g., a travel event, traffic event, etc.) is identified by computing device 300, computing device 300 may execute various corrective or preventive actions.

The determination of the type of preventive or corrective action to take may be based upon, for example, the type of anomalous condition, the type of destination vehicle (e.g., whether the vehicle may engage in autonomous driving, whether the vehicle is a smart vehicle, etc.), and/or the capabilities of the destination vehicle. For example, as will be further discussed below, computing device 300 may generate an alert, calculate an alternate travel route that avoids the location of the anomalous condition, calculate driving directions for the vehicle in which computing device 300 is located to travel along the alternate travel route, autonomously re-route the vehicle in which computing device 300 is implemented, etc.

Furthermore, depending upon the implementation of computing device 300, the methods and processes utilized to determine the existence of anomalous conditions may be performed locally, remotely, or any suitable combination of local and remote processing techniques.

Figure 3:
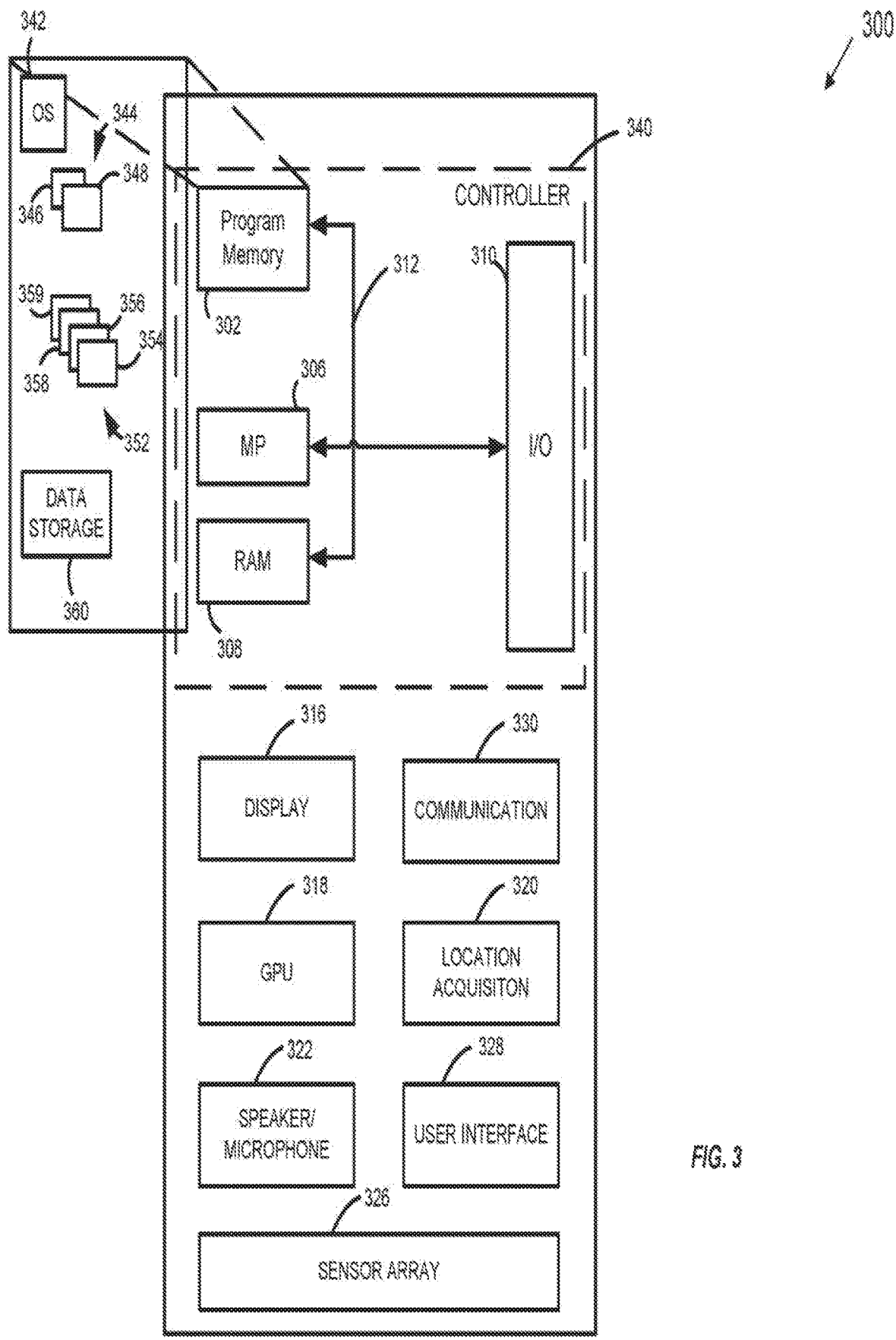
FIG. 3 illustrates a block diagram of an exemplary computing device or mobile device 300 in accordance with an exemplary aspect of the present disclosure.

FIG. 3 illustrates a block diagram of an exemplary computing device 300 in accordance with an exemplary aspect of the present disclosure. Computing device 300 may be implemented as any suitable computing device configured to (1) monitor, measure, generate, and/or or collect telematics data; (2) broadcast the geographic location data and/or the telematics data to one or more external components, such as via wireless communication and/or data transmission; (3) receive geographic location data and/or telematics data and/or other data (e.g., notifications, telematics-related messages, etc. broadcasted from another device, such as via wireless communication and/or data transmission; (4) determine whether an anomalous condition exists at the geographic location indicated by the geographic location data based upon the telematics data, geographic location data, and/or other data; (5) generate one or more alerts indicative of the anomalous condition; and/or (6) broadcast one or more alert notifications to other devices, such as via wireless communication and/or data transmission.

Computing device 300 may include a display 316, a graphics processing unit (GPU) 318, a location acquisition unit 320, a speaker/microphone 322, a sensor array 326, a user interface 328, a communication unit 330, and/or a controller 340.

In one aspect, controller 340 may include a program memory 302, a microprocessor (MP) 306, a random-access memory (RAM) 308, and/or an input/output (I/O) interface 310, each of which may be interconnected via an address/data bus 312. Controller 340 may be implemented as any suitable type and/or number of processors, such as a host processor for the relevant device in which computing device 300 is implemented, for example. In some aspects, controller 340 may be configured to communicate with additional data storage mechanisms that are not shown in FIG. 3 for purposes of brevity (e.g., one or more hard disk drives, optical storage drives, solid state storage devices, etc.) that reside within or are otherwise associated with mobile computing device 300.

Program memory 302 may be implemented as any suitable number and/or type of memory unit configured to store data used in conjunction with one or more functions performed by computing device 300, which may facilitate the interaction between computing device 300 and one or more other devices. For example, if computing device 300 is implemented as a mobile computing device (e.g., mobile computing device 204.1, as shown in FIG. 2), then program memory 302 may store one or more programs, applications, algorithms, etc. that, when executed by controller 340, facilitate the interaction between computing device 300 and (i) one or more networks (e.g., network 201), (ii) other mobile computing devices (e.g., mobile computing device 204.2), (iii) external computing devices (e.g., external computing device 206), (iv) vehicles (e.g., vehicle 108), (v) vehicle on-board computers (e.g., on-board computer 114, as shown in FIG. 1 and/or smart vehicle control system 500, which is further discussed below with reference to FIG. 5), infrastructure components (e.g., infrastructure component 208), etc.

In various aspects, program memory 302 may be implemented as a non-transitory tangible computer readable media configured to store computer-readable instructions, that when executed by controller 340, cause controller 340 to perform various acts. Program memory 302 may include an operating system 342, one or more software applications 344, and one or more software routines 352. To provide another example, program memory 302 may include other portions to store data that may be read from and written to by MP 306, such as data storage 360, for example.

One or more MPs 306 may be configured to operate in conjunction with one or more of display 316, communication unit 330, GPU 318, location acquisition unit 320, speaker/microphone 322, user interface 328, sensor array 326, I/O block 310, RAM 308, and/or program memory 302 to process and/or analyze data, to store data to program memory 302, to retrieve data from program memory 302, and/or to perform one or more insurance-related and/or telematics data-based functions.

For example, one or more MPs 306 and/or communication unit 330 may facilitate receiving data from and/or sending data to one or more other devices. For example, with reference to FIG. 2, one or more MPs 306 and/or communication unit 330 may facilitate sending data to and/or receiving data from one or more mobile computing devices 204.1-204.N, one or more vehicles 202.1-202.N, external computing device 206, one or more infrastructure components 208, etc. To facilitate this functionality, one or more MPs 306 may be coupled via one or more wired and/or wireless interconnections to one or more other components of computing device 300, such as via any suitable number of data and/or address buses, for example. These interconnections are not shown in FIG. 3 for purposes of brevity.

In one aspect, one or more MPs (micro-processors) 306 may be configured to execute one or more of software applications 344, software routines 352 residing in program memory 302, and/or other suitable software applications. For example, operating system 342 may be implemented as any suitable operating system platform depending upon the particular implementation of computing device 300. For example, if computing device 300 is implemented as a mobile computing device, operating system 342 may be implemented as a mobile OS platform such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

In one embodiment, data storage 360 may store data such as application data for the one or more software applications 344, routine data for the one or more software routines 352, geographic location data and/or telematics data, etc.

Display 316 may be implemented as any suitable type of display and may facilitate user interaction with computing device 300 in conjunction with user interface 328. For example, display 316 may be implemented as a capacitive touch screen display, a resistive touch screen display, etc. In various embodiments, display 316 may be configured to work in conjunction with controller 340 and/or GPU 318 to display alerts and/or notifications received from other devices indicative of detected anomalous conditions.

Communication unit 330 may be configured to facilitate communications between computing device 300 and one or more other devices, such as other mobile computing devices, networks, external computing devices, smart infrastructure components, etc. To accomplish this, communication unit 330 may be implemented with any suitable number and/or type of hardware components such as, for example, one or more transceivers, receivers, transmitters, antennas, ports, etc.

As previously discussed with reference to FIGS. 1 and 2, computing device 300 may be configured to communicate with these other devices in accordance with any suitable number and type of communication protocols. Thus, in various aspects, communication unit 330 may be configured to support any suitable number and type of communication protocols based upon a particular network and/or device in which computing device 300 is communicating to facilitate this functionality.

Communication unit 330 may be configured to support separate or concurrent communications, which may be the same type of communication protocol or different types of communication protocols. For example, communication unit 330 may be configured to facilitate communications between computing device 300 and an external computing device (e.g., external computing device 206) via cellular communications while facilitating communications between computing device 300 and the vehicle in which it is carried (e.g., vehicle 108) via BLUETOOTH communications.

Communication unit 330 may be configured to broadcast data and/or to receive data in accordance with any suitable communications schedule, which may be periodic (e.g., recurring) or aperiodic (e.g., transmitted when a memory buffer is full of collected telematics data, transmitted once an anomalous condition is identified, etc.). For example, communication unit 330 may be configured to broadcast geographic location data and/or telematics data every 15 seconds, every 30 seconds, every minute, etc.

The data received by computing device 300 may include any suitable type of data without departing from the spirit and scope of the aspects described herein. For example, communication unit 330 may facilitate computing device 300 receiving telematics data, geographic location data, and/or other telematics-related data (alert notifications, telematics-related messages, etc.) that is transmitted from another device.

As will be further discussed below, the geographic location data and/or telematics data may be sampled in accordance with any suitable sampling period. Thus, when broadcasted by communications unit 330 in accordance with a recurring schedule, the geographic location data and/or telematics data may include a log or collection of the geographic location data and/or telematics data that was sampled since the last data transmission. A suitable communication schedule may be selected as a tradeoff between a desired anomalous condition detection speed and battery usage of computing device 300, when applicable.

Additionally or alternatively, aspects include communication unit 330 being configured to conditionally send data, which may be particularly advantageous when computing device 300 is implemented as a mobile computing device, as such conditions may help reduce power usage and prolong battery life. For example, communication unit 330 may be configured to only broadcast when telematics data has been sampled since the last transmission, which will be further discussed below with regards to sensor array 326. Controller 340 may determine whether has been sampled since the last transmission by, for example, analyzing a memory address range (e.g., in data storage 360, RAM 308, etc.) associated with the storage of the telematics data and comparing the contents of this buffer to a known range of valid values.

To provide another example, aspects include communication unit 330 being additionally or alternatively configured to only broadcast telematics data when computing device 300 is connected to a power source (e.g., an in-vehicle charger). To provide still another example, aspects include communication unit 330 being additionally or alternatively configured to only broadcast telematics data when communication unit 330 is connected to and/or communicating with a device identified as a vehicle. This may include, for example, identifying a BLUETOOTH connection as a valid vehicle to satisfy this condition upon installation and/or setup of the relevant application or program executed by computing device 300 to facilitate the functionality described herein.

Location acquisition unit 320 may be configured to generate geographic location data utilizing any suitable global positioning techniques. For example, location acquisition unit 320 may communicate with one or more satellites and/or wireless transmitters to determine a location of computing device 300. Location acquisition unit 320 may use "Assisted Global Positioning System" (A-GPS), satellite GPS, or any other suitable global positioning protocol (e.g., the GLONASS system operated by the Russian government, the Galileo system operated by the European Union, etc.) to determine a geographic location of computing device 300.

In one aspect, location acquisition unit 320 may periodically store one or more geographic locations of computing device 300 as geographic location data in any suitable portion of memory utilized by computing device 300 (e.g., program memory 302, RAM 308, etc.) and/or to another device (e.g., another mobile computing device, an external computing device, etc.). In this way, location acquisition unit 320 may sample the location of computing device 300 in accordance with any suitable sampling rate (e.g., every 5 seconds, 10 seconds, 30 seconds, etc.) and store this geographic location data representing the position of computing device 300, and thus the vehicle in which it is travelling, over time.

Speaker/microphone 322 may be configured as one or more separate devices. Speaker/microphone 322 may include a microphone configured to detect sounds and to convert sounds to data suitable for communications via communications unit 330. Speaker/microphone 322 may additionally or alternatively include a speaker configured to play sound in response to data received from one or more components of computing device 300 (e.g., controller 340). In one embodiment, speaker/microphone 322 may be configured to play audible alerts.

User-interface 328 may be implemented as any suitable device configured to collect user input, such as a "soft" keyboard displayed on display 316 of computing device 300, a keyboard attached to computing device 300, an external keyboard communicating via a wired or a wireless connection (e.g., a BLUETOOTH keyboard), an external mouse, etc.

Sensor array 326 may be configured to measure any suitable number and/or type of sensor metrics as part of the telematics data. In one aspect, sensor array 326 may be implemented as one or more sensors positioned to determine the speed, force, heading, and/or direction associated with movements of computing device 300 and, thus, a vehicle in which computing device 300 is positioned. Additionally or alternatively, sensor array 326 may be configured to communicate with one or more portions of computing device 300 to measure, collect, and/or generate one or more sensor metrics from one or more non-sensor sources, which will be further discussed below.

To generate one or more sensor metrics, sensor array 326 may include, for example, one or more cameras, accelerometers, gyroscopes, magnetometers, barometers, thermometers, proximity sensors, light sensors, Hall Effect sensors, etc. In aspects in which sensor array 326 includes one or more accelerometers, sensor array 326 may be configured to measure and/or collect accelerometer metric values utilizing an X-axis, Y-axis, and Z-axis accelerometer. In accordance with such aspects, sensor array 326 may measure sensor metric values as a three-dimensional accelerometer vector that represents the movement of computing device 300 in three dimensional space by combining the outputs of the X-axis, Y-axis, and Z-axis accelerometers using any suitable techniques.

In one aspect, sensor array 326 may include one or more cameras or other image capture devices. In accordance with such aspects, the one or more cameras that are part of sensor array 326 may be mounted or otherwise positioned on mobile computing device 300 such that, when mobile computing device 300 is docked, cradled, or otherwise mounted within a vehicle, images may be captured from this vantage point. For example, when mobile computing device 300 is mounted within a vehicle, a camera implemented by sensor array 326 may function as a dashboard camera, capturing images and/or video data of various objects outside of the vehicle from this vantage point. Additionally or alternatively, mobile computing device 300 may capture audio data with the image and/or video data via speaker/microphone 322.

In various aspects, mobile computing device 300 may begin to capture data upon detecting that it has been placed in a cradle, and otherwise not capture data in such a manner. This detection may occur, for example, via one or more conditions being satisfied. For example, mobile computing device 300 may utilize one or more sensors (e.g., an accelerometer that is part of sensor array 326) to determine that mobile computing device 300 has changed orientation to horizontal (as is common when docked in a vehicle), that mobile computing device 300 is communicating via BLUETOOTH with the vehicle, that the vehicle is moving above a threshold speed, etc. Aspects include any suitable number of conditions, upon being satisfied, triggering mobile computing device 300 to start collecting telematics data, images, audio, video, etc., via sensor array 326.

In various aspects, sensor array 326 may be configured to sample the one or more sensor metrics in accordance with any suitable sampling rate and/or based upon one or more conditions being satisfied. For example, sensor array 326 may be configured to implement one or more accelerometers to sample sensor metrics indicative of a g-force associated with vehicle braking, acceleration, and cornering at a rate of 15 Hz, 30 Hz, 60 Hz, etc., which may be the same sampling rate as one another or different sampling rates. To provide another example, sensor array 326 may be configured to implement one or more gyroscopes to improve the accuracy of the measured one or more sensor metrics and to determine whether the phone is in use or stationary within a vehicle. To provide another example, sensor array 326 may implement a compass (magnetometer) to determine a direction or heading of a vehicle in which computing device 300 is located. Additional examples of sensor metrics may be those applicable to the determination of a current lane the vehicle is in, which may be derived, for example, via an image analysis of image and/or video data obtained via one or more cameras that may be integrated as part of sensor array 326.

Again, sensor array 326 may additionally or alternatively communicate with other portions of computing device 300 to obtain one or more sensor metrics even though these sensor metrics may not be measured by one or more sensors that are part of sensor array 326. For example, sensor array 326 may communicate with one or more of location acquisition unit 320, communication unit 330, and/or controller 340 to obtain data such as timestamps synchronized to the sampling of one or more sensor metrics (which may be measured to within hundredths of a second or smaller resolutions), geographic location data (and correlated timestamps thereof), a velocity based upon changes in the geographic location data over time, a battery level of computing device 300, whether a battery of computing device 300 is charging, whether computing device 300 is being handled or otherwise in use, an operating status of computing device 300 (e.g., whether computing device 300 is unlocked and thus in use).

In various aspects, sensor array 326 may base timestamps upon any suitable clock source, such as one utilized by location acquisition unit 320 for GNSS functions. The timestamps may be, for example, recorded or logged as various data is sampled to be synchronized to the sampling of one or more sensor metrics (which may be measured to within hundredths of a second or smaller resolutions).

Additionally or alternatively, sensor array 326, location acquisition unit 320, and/or communication unit 330 may log or otherwise measure various metrics or other data that may be used by controller 340 to determine usage metrics such as how often the functionality of the Telematics Application is being utilized when a vehicle is being driven. For example, sensor array 326 may log the time when telematics data is being collected, when the Telematics Application is running, and/or when the Telematics Application has been started. To provide additional examples, communication unit 330 may store data indicative of a BLUETOOTH connection status of mobile computing device 300. To provide yet another example, location acquisition unit 320 may store and/or log the changes in geographic location of mobile computing device 300 over time.

In various aspects, controller 340 may determine how often a driver uses the Telematics App based upon any suitable combination of the aforementioned data. For example, the BLUETOOTH connection status may be leveraged to determine whether mobile computing device 300 is located in a vehicle. To provide another example, the changes in the geographic location data over time may be utilized to determine whether mobile computing device 300 has exceeded a threshold speed for a threshold duration of time. In this way, a determination may be made whether mobile computing device 300 is located in a vehicle while the vehicle is being driven.

Various aspects include the aforementioned data being leveraged to calculate a usage amount in which a user utilizes the Telematics App while driving. For example, the usage amount may be based upon a total proportion of time (e.g., 80% of the time while driving, the functionality provided by the Telematics App is enabled). To provide another example, the usage amount may be mileage-based (e.g., 90' of the miles driven are done so with the functionality of the Telematics App available to the driver). As discussed above, this usage data may be sent to an insurer or other third party via a telematics data transmission or a separate transmission and used to set and/or adjust an insurance policy, premium, or discount for the insured customer.

In one aspect, sensor array 326 may sample one or more sensor metrics based upon one or more conditions being satisfied. For example, sensor array 326 may determine, based upon gyroscope sensor metrics, communication with controller 340, etc., whether computing device 300 is in use. If computing device 300 is in use (e.g., when implemented as a mobile computing device) then the movement of computing device 300 within the vehicle may not truly represent the vehicle motion, thereby causing sensor metrics sampled during this time to be erroneous. Therefore, aspects include sensor array 326 sampling the one or more sensor metrics when computing device 300 is not in use, and otherwise not sampling the one or more sensor metrics.

In one aspect, sensory array 326 may include one or more cameras and/or image capture devices. When sensory array 326 is implemented with one or more cameras, these cameras may be configured as any suitable type of camera configured to capture and/or store images and/or video. For example, when mobile computing device 300 is mounted in a vehicle, the camera may be configured to store images and/or video data of the road in front of the vehicle in which it is mounted, and to store this data to any suitable portion of program memory 302 (e.g., data storage 360). Controller 340 and/or MP 306 may analyze this data to generate one or more local alerts, to transmit signals indicative of detected alters to one or more other devices, etc., which is further discussed below with reference to the execution of anomalous condition detection routine 358.

Again, the telematics data broadcasted by computing device 300 may include one or more sensor metrics. However, the telematics data may additionally or alternatively include other external data that may be relevant in determining the presence of an anomalous condition. For example, the telematics data may include external data such as speed limit data correlated to a road upon which computing device 300 is located (and thus the vehicle in which it is travelling), an indication of a type of road, a population density corresponding to the geographic location data, etc.

In some aspects, computing device 300 may obtain this external data by referencing the geographic location data to locally stored data (e.g., data stored in data storage 360) and broadcasting this data appended to or otherwise included with the sensor metrics data as part of the telematics data. In other aspects, the device receiving the telematics data (e.g., a mobile computing device, an external computing device, an infrastructure component) may generate the external data locally or via communications with yet another device. As will be further discussed below, this external data may further assist the determination of whether an anomalous condition is present.

In some aspects, software applications 344 and/or software routines 352 may reside in program memory 302 as default applications that may be bundled together with the OS of computing device 300. For example, web browser 348 may be part of software applications 344 that are included with OS 342 implemented by computing device 300.

In other aspects, software applications 344 and/or software routines 352 may be installed on computing device 300 as one or more downloads, such as an executable package installation file downloaded from a suitable application store via a connection to the Internet. For example, alert notification application 346, telematics collection routine 354, geographic location determination routine 356, and/or anomalous condition detection routine 358 may be stored to suitable portions of program memory 302 upon installation of a package file downloaded in such a manner. Examples of package download files may include downloads via the iTunes store, the Google Play Store, the Windows Phone Store, downloading a package installation file from another computing device, etc. Once downloaded, alert notification application 346 may be installed on computing device 300 as part of an installation package such that, upon installation of alert notification application 346, telematics collection routine 354, geographic location determination routine 356, and/or anomalous condition detection routine 358 may also be installed.

In one embodiment, software applications 344 may include an alert notification application 346, which may be implemented as a series of machine-readable instructions for performing the various tasks associated with executing one or more embodiments described herein. In one aspect, alert notification application 346 may cooperate with one or more other hardware or software portions of computing device 300 to facilitate these functions.

In one aspect, alert notification application 346 may function as a Telematics Application (or "App") which is downloaded and installed on mobile computing device (or mobile device) 300 by a user via a suitable third-party software store and/or portal (e.g., Apple iTunes, Google Play, the Windows Store, etc.).

To provide an illustrative example, alert notification application 344 may include instructions for performing tasks such as determining a geographic location of computing device 300 (e.g., via communications with location acquisition unit 330), monitoring, measuring, generating, and/or collecting telematics data, broadcasting the geographic location data and/or the telematics data to one or more external devices, receiving geographic location data and/or telematics data from another computing device, determining whether an anomalous condition exists based upon the geographic location data and/or the telematics data, generating one or more alerts indicative of the determined anomalous condition, receiving user input, facilitating communications between computing device 300 and one or more other devices in conjunction with communication unit 330, etc.

To provide another example, aspects include mobile computing device 300 being configured to capture image and/or video data while cradled in a dock or otherwise mounted within a vehicle, as previously discussed. In accordance with various aspects, this data capture may be facilitated, for example, by instructions stored in alert notification application 346 being executed by controller 340 and/or MP 306. Thus, in various aspects, alert notification application 346 may facilitate mobile computing device 300 capturing image, audio, and/or video data at any suitable sampling rate (e.g., once every second, 5 times per second, etc.) and storing this data to any suitable portion of the mobile computing device (e.g., data storage 360). Aspects include data sampling processes occurring as background operations to allow other applications to be run on mobile computing device 300 (e.g., navigation applications) while telematics data and/or images, video, and/or audio data is collected by mobile computing device 300.

Software applications 344 may include a web browser 348. In some embodiments (e.g., when computing device 300 is implemented as a mobile computing device), web browser 348 may be a native we browser application, such as Apple's Safari®, Google Android™ mobile web browser, Microsoft Internet Explorer® for Mobile, Opera Mobile™, etc. In other embodiments, web browser 348 may be implemented as an embedded web browser.

Regardless of the implementation of web browser 348, various aspects include web browser 348 being implemented as a series of machine-readable instructions for interpreting and displaying web page information received from an external computing device (e.g., external computing device 204.2, as shown in FIG. 2). This web page information may be utilized in conjunction with alert notification application 346 to perform one or more function of the aspects as described herein.

In one embodiment, software routines 352 may include a telematics collection routine 354. Telematics collection routine 354 may include instructions, that when executed by controller 340, facilitate sampling, monitoring, measuring, collecting, quantifying, storing, encrypting, transmitting, and/or broadcasting of telematics data. In some aspects, telematics collection routine 354 may facilitate collection of telematics data locally via one or more components of computing device 300 (e.g., via sensor array 326, location acquisition unit 320, controller 340, etc.). In other aspects, telematics collection routine 354 may facilitate the storage of telematics data received from another device (e.g., via communication unit 330).

In one aspect, telematics collection routine 354 may work in conjunction with controller 340 and/or alert notification application 346 to periodically listen for and/or to periodically broadcast telematics data. For example, controller 340 may, upon executing alert notification application 346, periodically listen for a broadcast containing telematics data generated and transmitted from other mobile computing devices, vehicles, external computing devices, and/or infrastructure components. Upon detecting a broadcast, controller 340 may download the broadcast to a suitable portion of memory unit 302 and analyze the telematics data contained therein for potential traffic events, travel events, alerts, messages, etc. Such aspects may be particularly useful, for example, to save battery life of the mobile computing device, as continuous listening is not necessary but instead may be performed, for example, in accordance with a particular timing schedule.

To provide another example, controller 340 may, upon executing alert notification application 346, periodically broadcast telematics data, which may be received by other mobile computing devices, vehicles, external computing devices, and/or infrastructure components. To provide an illustrative example, the telematics data may be sampled, updated, and/or broadcasted in accordance with a periodically recurring schedule or sampling rate (e.g., five times per second, every second, once every 5 seconds, once every ten seconds, etc.) when a Telematics App installed on a mobile computing device is executed.

In one embodiment, software routines 352 may include a geographic location determination routine 356. Geographic location determination routine 356 may include instructions, that when executed by controller 340, facilitate sampling, measuring, collecting, quantifying, storing, transmitting, and/or broadcasting of geographic location data (e.g., latitude and longitude coordinates). In some aspects, geographic location determination routine 356 may facilitate generating and/or storing geographic location data locally via one or more components of computing device 300 (e.g., via location acquisition unit 320 and/or communication unit 330). In other aspects, geographic location determination routine 356 may facilitate the storage of geographic location data received from another device (e.g., via communication unit 330).

Additionally or alternatively, software routines 352 may include anomalous condition detection routine 358. Anomalous condition detection routine 358 may include instructions, that when executed by controller 340, facilitate the determination of whether an anomalous condition exists based upon the telematics data, the geographic location data, one or more telematics-related messages included in a received telematics data transmission (e.g., transmitted by another mobile computing device, smart infrastructure, another vehicle, etc.), and/or image and/or video data captured by one or more cameras or other imaging devices.

An anomalous condition may include any suitable condition that indicates a deviation from normal traffic patterns or otherwise poses a potential hazard or inconvenience to other drivers. In various aspects, an anomalous condition may be detected based upon an analysis of locally generated or collected telematics data, telematics data received from another computing device via communication unit 330, an analysis of data transmitted with and/or included as part of a telematics data broadcast or transmission, an analysis of one or more received telematics-related messages (e.g., alert notifications), etc.

For example, MP 306 may execute instructions stored in anomalous condition detection routine 358 to determine or identify whether a travel event exists associated with telematics data received from an originating device or vehicle, a GPS location or other location of the travel event, whether the telematics data includes a message indicating the existence of the travel event, an estimated or actual geographical or temporal scope of the travel event from an analysis of telematics data, etc. In other words, computing device 300 may analyze the telematics data itself and/or any suitable portion of the transmission in which the telematics data is sent to attempt to identify an alert, location, indication, and/or message regarding a travel event or other anomalous condition that has already been identified by another device. For example, the telematics data (or other data sent with the telematics data as part of a data transmission) may include a message or other information indicating a type of anomalous condition or travel event, when it was detected, and its geographic location.

To provide another example, the telematics data or telematics data transmission may include information that identifies the nature, severity, and/or area of impact of a travel event or other anomalous condition. This information may thus identify the travel event or other anomalous condition that the mobile computing device, smart infrastructure, or vehicle has encountered or is presently encountering. Computing device 300 may then use such information to identify the travel event at that location and/or to take or direct corrective or preventive action to facilitate safer vehicle travel for the moving vehicle in which computing device 300 is located. For example, computing device 300 may generate, display, and/or provide an alert for the driver of the moving vehicle in which computing device 300 is located, which is further discussed below.

To provide an illustrative example, if an accident occurs, traffic may slow down due to a car pileup, a reduction in available lanes, and/or rerouting of traffic. Because the telematics data may include data indicative of the speed limit at the location corresponding to the geographic location where the telematics data was sampled, a comparison between the speed of computing device 300 and the posted or other speed limit data (such as a comparison between mobile device or vehicle speed with a map of, and/or known, posted speed limit information) may indicate an anomalous condition. Furthermore, because each vehicle may sample and/or broadcast geographic location data and/or telematics data in real time, the anomalous conditions may be detected with minimal delay as they occur.

Although the speed of the vehicle may indicate an anomalous condition, aspects include other types of anomalous conditions being detected based upon the telematics data. For example, an anomalous condition may be identified when the one or more sensor metrics indicate that an airbag has been deployed, and thus the vehicle associated with computing device 300 has been in an accident. This may be determined, for example, via an analysis of barometer readings matching a pressure versus time profile and/or via an indication from a dedicated airbag deployment sensor located in the vehicle.

To provide another example, an anomalous condition may be identified based upon weather fluctuations associated with a rapid formation of ice, a sudden change from a paved to a dirt road, the triggering of a crash detection system, a threshold number of wheel slips and/or skids being sampled within a threshold sampling period (indicating slippery conditions), sensor metrics indicative of a rollover condition, a sudden stop (indicating a collision), a departure from the road (indicating a pulled over vehicle), etc.

To provide another illustrative example based upon a traffic accident, if a first vehicle carrying a first computing device 300 is slowed down due to a traffic accident, then the one or more sensor metrics sampled by sensor array 326 will indicate the speed of the first vehicle over a period of time. If the one or more sensor metrics indicate that the first vehicle's speed is below the speed limit by some threshold amount or proportion thereof (e.g., 20 mph in a 55 mph zone, 50% of the posted speed limit, etc.) and this is maintained for a threshold duration of time (e.g., 30 seconds, one minute, two minutes, etc.) then controller 340 may, upon execution of anomalous condition detection routine 358, conclude that an anomalous condition has been detected. This anomalous condition may also be correlated to the geographic location associated with the geographic location data due to synchronization between the geographic location data and the sampled telematics data.

Further continuing this example, upon determination of the anomalous condition, alert notification application 346 may broadcast a notification indicating the detected anomalous condition, the telematics data, and/or the geographic location data associated with the detected anomalous condition. In one aspect, a second vehicle equipped with a second computing device 300 may receive this data and further determine whether the anomalous condition is relevant based upon the geographic relationship between the first and second devices, which is further discussed below. If the anomalous condition is relevant, then the second computing device 300 may generate an alert indicating the anomalous condition.

To provide another example by modifying the details of the previous one, aspects may include computing device 300 broadcasting telematics data and/or geographic location data but not notification data. In accordance with such aspects, upon being received by a second computing device 300 (e.g., a mobile computing device in a second vehicle, an external computing device, a smart infrastructure component, etc.) the second computing device 300 may determine the relevance of the anomalous condition based upon the geographic relationship between itself and the first computing device 300.

If the second computing device 300 determines that an anomalous condition, even if present, would be irrelevant or inapplicable based upon the distance between these devices, the second computing device 300 may ignore the telematics data, thereby saving processing power and battery life. However, if the second computing device 300 determines that the geographic location data indicates a potentially relevant anomalous condition, the second computing device 300 may further process the telematics data and take the appropriate corrective or preventive action if an anomalous condition is found (e.g., issue an alert notification, generate an alert for the driver of the vehicle, display a warning message, etc.).

To provide yet another example by further modifying the details in the previous two, aspects may include computing device 300 broadcasting the telematics data and geographic location data to an external computing device (e.g., to external computing device 206 via network 201, as shown in FIG. 2). In addition, the second computing device 300 associated with the second vehicle may likewise broadcast telematics data and geographic location data to the external computing device. In accordance with such aspects, the external computing device may determine whether an anomalous condition exists and is relevant to each of the first and second devices 300 based upon a geographic relationship between the first and second devices 300. When relevant, external computing device may be configured to send alert notifications to the first and/or second devices 300, which may include any suitable type of communications such as push notifications, a short messaging service (SMS) message, an email, a notification that used in conjunction with the OS running on each receptive computing device 300, etc. Upon receiving the notification from the external computing device, the first and/or second computing device 300 may generate an alert indicating a description of the anomalous condition and/or its location.

The geographic relationship between two or more devices 300 may be utilized in several ways to determine the relevance of the anomalous condition and/or whether to take corrective or preventive action. For instance, current speed, location, route, destination, and/or direction of travel of a first vehicle (collecting and/or associated with the telematics data) may be individually or collectively compared with current speed, location, route, destination, and/or direction of travel of a second vehicle traveling on the road. As one example of the geographic relationship, a first vehicle location (and associated with a travel or traffic event) may be compared with a second vehicle location, current route, and/or destination to determine whether the second vehicle should divert course or slow down to alleviate the risk of the second vehicle being involved in a collision or a traffic jam (as a result of the travel or traffic event that is identified by the telematics data).

As another example of the geographic relationship, a radius from one vehicle or a line-of-sight distance between vehicles may be utilized and compared to a threshold distance. For example, if computing device 300 is implemented as an external computing device and determines a line-of-sight distance between a first and second vehicle to be less than a threshold distance (e.g., a half mile, one mile, etc.), then the external computing device may issue an alert notification to both vehicles. In this way, an external computing device may act as an alert management device, processing data and sending notifications to those devices for which a detected anomalous condition is relevant.

In another example of the geographic relationship, the geographic location data may be correlated with a map database to associate the anomalous condition with a road and to determine the relevance of the anomalous condition based upon other vehicles sharing the road. The map database may be stored, for example, in a suitable portion of computing device 300 (e.g., data storage 360) or retrieved via communications with one or more external computing devices. To provide an illustrative example, a computing device 300 may be implemented as an external computing device. The external computing device may determine, from telematics data and geographic location data received from a first computing device 300, that a first vehicle is located on a highway at a certain geographic location. If the external computing device determines that a second computing device 300 in a vehicle travelling on the same highway is within a threshold distance approaching the first vehicle, then the external computing device may issue an alert notification to the second vehicle.

In yet other aspects, the geographic location data may be correlated with a geofence database to determine the relevance of the anomalous condition based upon whether other vehicles are located inside the geofence. The geofence database may be stored, for example, in a suitable portion of computing device 300 (e.g., data storage 360) or retrieved via communications with one or more external computing devices. To provide another illustrative example, a computing device 300 may be implemented as an external computing device. The external computing device may determine, from telematics data and geographic location data received from a first computing device 300, that a first vehicle is located on a highway at a certain geographic location. The external computing device may calculate a geofence having a shape substantially matching the road upon which the first vehicle is travelling.

The geofence may be calculated as having any suitable shape such that the appropriate vehicles are notified of the detected anomalous condition. For example, the geofence shape may follow the contours of the road and extend ahead of the first vehicle and behind the first vehicle some threshold distances, which may be the same or different than one another. To provide another example, the geofence shape may include other arterial roads that feed into the road upon which the first vehicle is travelling, roads anticipated to be impacted by the anomalous condition, etc.

In some aspects, the geofence may be adjusted or modified based upon a change in the location of computing device 300. This change may be triggered using any suitable data indicative of potentially increasing road densities, such as changes in population density data associated with the geographic location of the computing device 300, changes in a type of road upon which computing device 300 is determined to be travelling, etc.

For example, a first computing device 300 may be implemented as a mobile computing device and associated with a first vehicle, while a second computing device 300 may be implemented as an external computing device. The external computing device may calculate an initial geofence as a threshold distance radius centered about the first vehicle's location. The geographic location data corresponding to the first vehicle's location may have associated population density data that is correlated with locally stored data or data retrieved by the external computing device. When the population density data surpasses a threshold density value, the shape of the geofence may be adjusted from the radius centered about the first vehicle's location to include only the road upon which the first vehicle is travelling. In this way, computing device 300 may prevent false alert notifications from being sent to other vehicles travelling in close proximity to the first vehicle, but on nearby roads unaffected by the detected anomalous condition.

To provide another illustrative example, as previously discussed, one or more cameras integrated as part of sensor array 326 may store image and/or video data from a vantage point within a vehicle in which mobile computing device 300 is mounted to act as a dashboard camera. In accordance with such aspects, anomalous condition detection routine 358 may include instructions, that when executed by controller 340, facilitate the analysis of the image and/or video data to detect one or more anomalous conditions that may pose an immediate threat, hazard, and/or inconvenience to the driver and/or other drivers in the vicinity. These anomalous objects may also be identified as a traffic event, as previously discussed.

In various aspects, any suitable type of object recognition and/or image recognition analysis may be performed upon captured image data to detect objects in the path of the vehicle, such as animals, pedestrians, other vehicles, potholes, etc. Furthermore, the captured mage data may be analyzed to identify other anomalous traffic conditions, events, etc., such as vehicle conditions, traffic, congestion, road construction, weather conditions, etc.

Again, upon detecting an anomalous object, computing device 300 may perform various corrective or preventive actions, such as generating, providing, and/or displaying an audible alert, visual alert and/or recommendation via display 316 and/or speaker/microphone 322. Additionally or alternatively, the corrective or preventive actions may include the generation, calculation, and/or display of an alternate route that avoids the location of the anomalous object, which is further discussed below. Because computing device 300 may be installed in a vehicle driven by an insured driver, these corrective actions may be directed to the insured driver in such instances. Thus, the corrective or preventive actions performed by mobile computing device 300 may alleviate or eliminate the risk of vehicle collisions or other damage to an insured vehicle or an insured driver.

Additionally or alternatively, mobile computing device 300 may, upon detecting an anomaly, broadcast one or more signals via communication unit 330, which are received directly or indirectly by other mobile computing devices. Again, these other mobile computing devices may then generate alert notifications locally when close to the geographic location of mobile computing device 300 where the signal was broadcasted. Aspects in which the detected anomalous condition is shared in this manner may be particularly useful when the identified anomaly is likely to threaten other drivers using the same road, such as potholes or objects blocking the roadway, for example.

The data transmitted via communication unit 330 may identify the type of anomaly, the location of the anomaly, a description of the anomaly, etc. For example, once an anomaly is detected, a data transmission may include a notification that identifies the type of abnormal condition or the extent of the abnormal condition by a length of time over which the anomaly has been observed as a result of the analysis of the captured image data, which may be indicated, for example, using timestamps or any other suitable indicator.

To provide another example, the transmission may include a notification that identifies the size or area impacted by the detected abnormal condition. That is, the notification may include an identifier that not only indicates the location of the detected anomaly, but an anticipated area of impact for other vehicles. The area of impact may be calculated, for example, based upon the type of anomaly and/or the severity of the anomaly that is detected. For example, the detection of a weather-related anomaly may result in an impact area being generated that is proportional to the severity of the weather (e.g., based upon wind speed, temperature, the presence of precipitation, etc.).

The inclusion of details regarding the type and severity of an identified anomalous condition have been described above with reference to anomalous conditions identified though the analysis of captured mage data. However, this information may be included with any telematics data and/or notification transmission. For example, if the telematics data indicates that the speed of the vehicle is less than a threshold vehicle speed over a threshold duration of time, a generated notification may include information such as the overall time and/or distance that the originating vehicle has (or still is) experiencing these delays.

In this way, any device provided herein configured to receive and analyze telematics data (e.g., computing device 300, smart vehicle control system 500, remote server 600, and/or smart infrastructure component 700) may analyze the telematics data and/or other data included in a telematics data transmission to estimate or determine the actual geographical or temporal scope of a travel event (e.g., an abnormal condition).

Additionally or alternatively, software routines 352 may include a route calculation routine 359. In one aspect, controller 340 may execute instructions stored in route calculation routine 359 to generate, calculate, and/or display travel routes, which may provide navigational guidance to a driver. For example, data storage 360 may store map and/or cartographic data (or this data may be received via communication unit 330 from an external computing device) to facilitate route mapping.

Furthermore, controller 340 may execute instructions stored in route calculation routine 359 to facilitate additional or alternate corrective or preventive actions when an anomaly is identified. For example, controller 340 may execute instructions stored in route calculation routine 359 to facilitate the calculation of an alternate travel route that avoids the location of the identified anomaly or an area associated with the anomaly (e.g., a radius, road, a geofence boundary, etc.), which may be displayed via display 316, for example.

Additionally or alternatively, controller 340 may execute instructions stored in route calculation routine 359 to facilitate the receipt of an alternate route (e.g., via one or more external computing devices, a vehicle in which mobile computing device 300 is located, smart infrastructure components, etc.) that avoids the location of the identified anomaly. In an aspect, the alternative route may function to dynamically re-route an insured vehicle while moving to avoid an location or area associated with an identified anomaly.

Although FIG. 3 depicts controller 340 as including one program memory 302, one MP 306, and one RAM 308, controller 340 may include any suitable number of program memory 302, MP 306, and RAM 308. Furthermore, although FIG. 3 depicts controller 340 as having a single I/O interface 310, controller 340 may include any suitable number and/or types of I/O interfaces 310. In various aspects, controller 340 may implement RAM(s) 308 and program memories 302 as any suitable type of memory, such as non-transitory computer readable memories, semiconductor memories, magnetically readable memories, and/or optically readable memories, for example.

Exemplary Screenshots of an Alert Notification Application

Figures 4A, 4B:
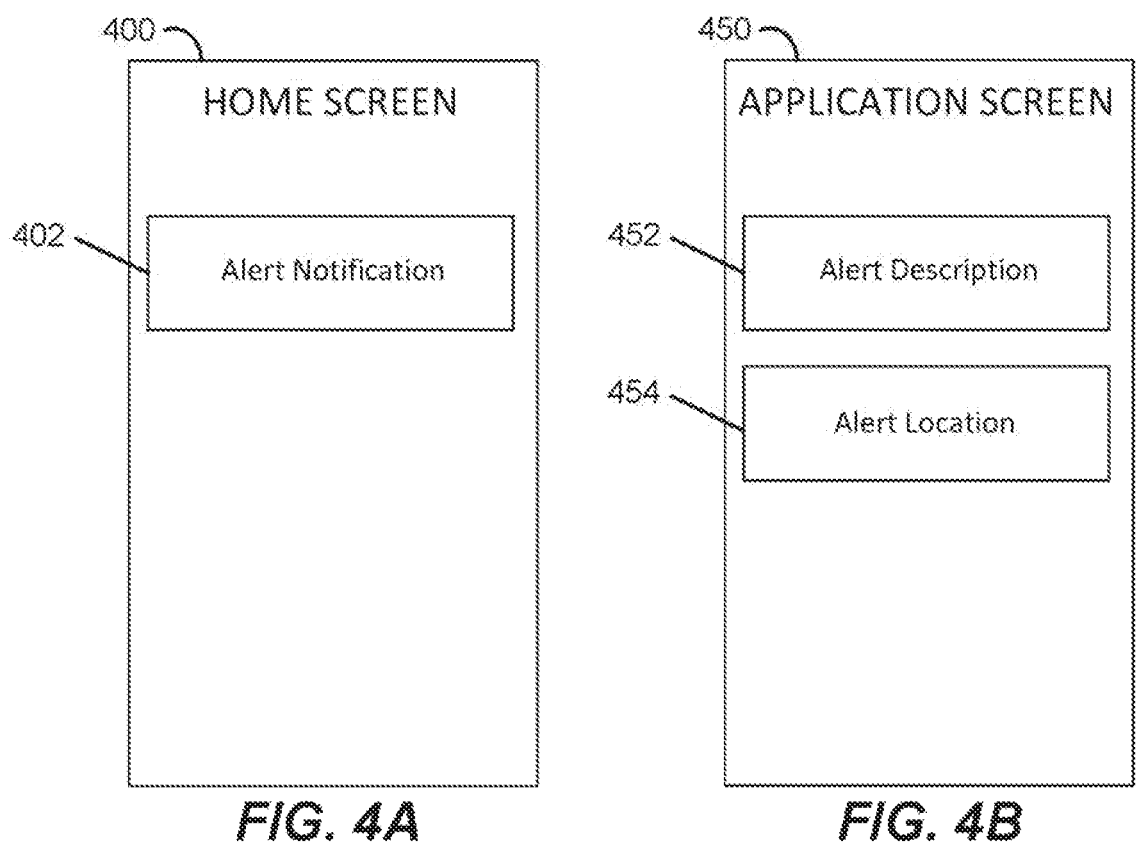
FIG. 4A illustrates an exemplary mobile computing device home screen 400 in accordance with an exemplary aspect of the present disclosure.
FIG. 4B illustrates an exemplary mobile computing device application screen 450 in accordance with an exemplary aspect of the present disclosure.

FIG. 4A illustrates an example mobile computing device home screen 400 in accordance with an exemplary aspect of the present disclosure. In various aspects, home screen 400 is displayed on a mobile computing device, such as mobile computing device 110 or mobile computing devices 204.1-204.2, as shown in FIGS. 1 and 2, respectively. In accordance with such aspects, home screen 400 may be displayed as part of a device display, such as display 316, for example, as shown in FIG. 3.

Home screen 400 may be displayed as a default screen on a mobile computing device. In one embodiment, home screen 400 may facilitate a lock screen of a mobile computing device. Lock screens may be typically displayed when a user locks the mobile computing device to enter a lock screen mode (e.g., by pressing a physical button). Additionally or alternatively, the mobile computing device may revert to the lock screen when inactive for a threshold period of time. The lock screen prevents a user from using a portion of the mobile computing device functionality. For example, a lock screen might prevent a mobile computing device in a user's pocket from accidentally sending SMS messages or phone calls.

Although lock screens typically limit the functionality of the device when enabled, it may be desirable for certain applications to provide a user with some functionality via the lock screen. For example, if the mobile computing device is used to play music, a lock screen overlay could allow a user to change tracks, pause a track, or adjust the volume level without unlocking the phone. In accordance with some aspects, alert notification 402 may be displayed as part of a home screen and/or lock screen of a mobile computing device, as shown in FIG. 4A.

Although alert notification 402 may be displayed as part of home screen 400, other aspects include alert notification 402 being displayed as part of a notification system separate from home screen 400. For example, some mobile phone operating systems (e.g., the Android OS) implement a universal "pull-down" notification system where all incoming notifications are displayed. In these notification systems, new notifications are initially previewed in a notification bar at the top of the phone display, and a user may pull down the notification bar (e.g., by using a swiping gesture) to access the details of any received notifications. In one aspect, alert notification 402 may be displayed as part of a notification bar type notification.

As previously discussed with reference to FIG. 3, a device running the alert notification application may be configured to determine whether an anomalous condition has been detected and/or to receive alert notifications sent by other devices that have done so. In accordance with such aspects, alert notification 402 is a block diagram representation of what may be generated upon detection of an anomalous condition and/or receiving an indication that an anomalous condition has been detected. Alert notification 402 may be implemented as any suitable graphic, label, text, description, etc., to convey this to a user. In one embodiment, alert notification 402 may be interactive and may facilitate a user selection via an appropriate gesture (e.g., swiping, tapping, etc.).

FIG. 4B illustrates an example mobile computing device application screen 450 in accordance with an exemplary aspect of the present disclosure. In various aspects, application screen 450 may be displayed on a mobile computing device, such as mobile computing device 110 or mobile computing devices 204.1-204.2, as shown in FIGS. 1 and 2, respectively. In accordance with such aspects, application screen 450 may be displayed as part of a device display, such as display 316, for example, as shown in FIG. 3.

In one aspect, application screen 450 may be displayed upon a user selecting alert notification 402 from home screen 400. Application screen 450 may include an alert description 452 and an alert location 454. Alert description 452 is a block diagram representation of one or more descriptions of the alerts related to the detected anomalous condition. Alert description 452 may be implemented as any suitable graphic, label, text, description, etc., to convey this to a user. For example, alert description 452 may include a text description such as "slow traffic ahead," "traffic at standstill ahead," "unpaved road ahead," "potential icy conditions ahead," "pulled over vehicle ahead," etc.

Alert location 454 is a block diagram representation of one or more descriptions of the location of the anomalous condition. Alert location 454 may be implemented as any suitable graphic, label, text, description, etc., to convey this to a user. For example, alert location 454 may include a directional compass indicating a direction towards the anomalous condition from the mobile computing device displaying application screen 450. To provide additional examples, alert location 454 may include a distance to the anomalous condition, a map overlaid with the location of the mobile computing device displaying application screen 450 to indicate the position of the mobile computing device in relation to the anomalous condition, the threshold distances and/or geofences used to determine the relevance of the anomalous condition, etc.

Exemplary Smart Vehicle Control System

Figure 5:
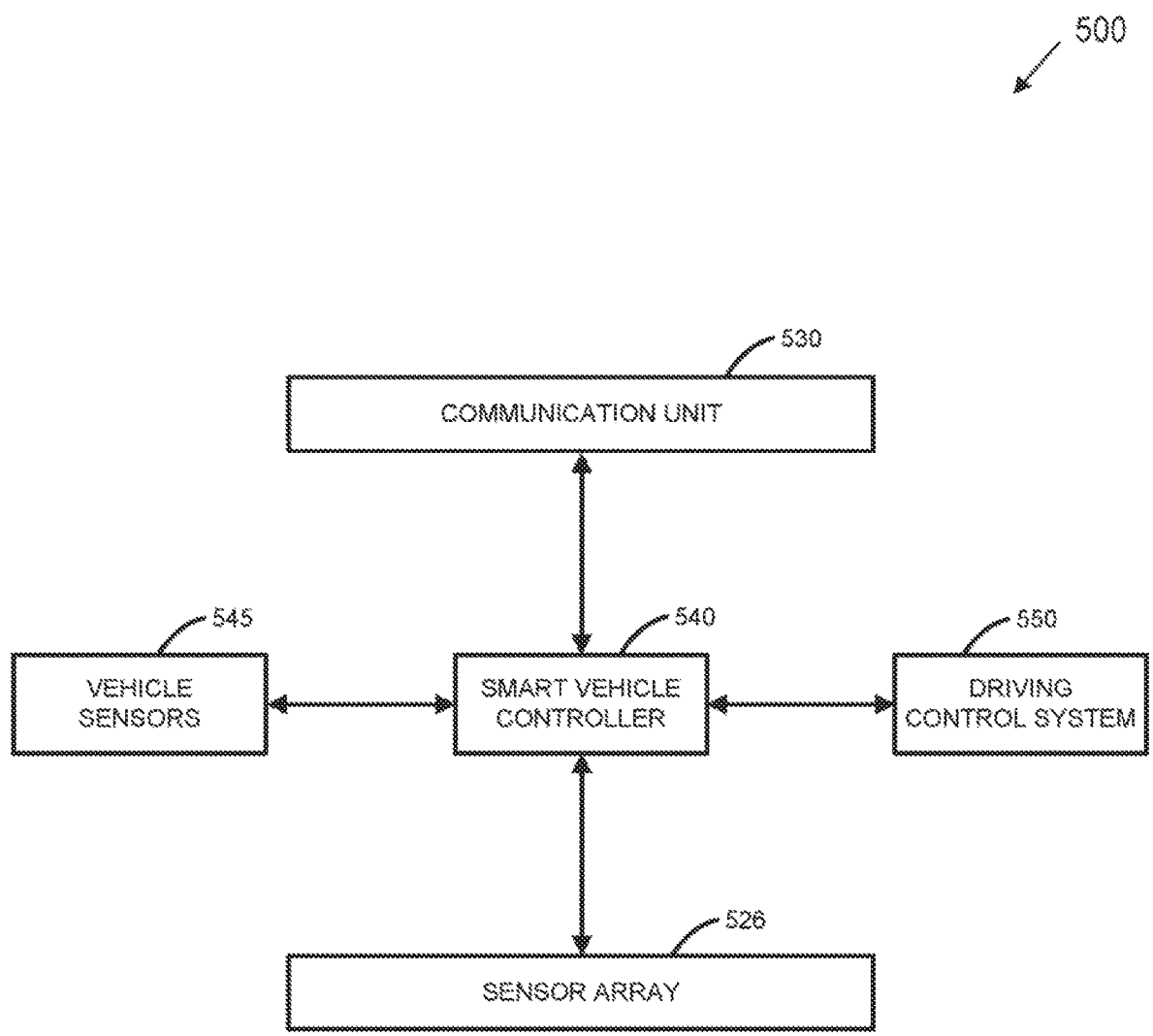
FIG. 5 illustrates a block diagram of an exemplary smart vehicle control system 500 in accordance with an exemplary aspect of the present disclosure.

FIG. 5 illustrates a block diagram of an exemplary smart vehicle control system 500 in accordance with an exemplary aspect of the present disclosure. In the present aspect, smart vehicle control system 500 may be implemented as any suitable computing device, such as a computing device that is integrated as part of a smart vehicle to facilitate autonomous driving and/or other smart driving functions. For example, smart vehicle control system may be integrated as part of one or more vehicles 201.1-202.N, as shown in FIG. 2, to provide these vehicles with such functionality. Smart driving functions may include, for example, the generation, receipt, collection, storage, and/or transmission of telematics data or other data, such as data previously discussed above with reference to on board computer 114 (as shown in FIG. 1) mobile computing devices 204.1-204.N, and/or vehicles 202.1-202.N (as shown in FIG. 2), for example.

Smart vehicle control system 500 may include a sensor array 526, a communication unit 530, a smart vehicle controller 540, one or more vehicle sensors 545, and/or a driving control system 550, one or more of which may be configured to communicate with one another to receive data from, and send data to, one another. Smart vehicle control system 500 may include additional, less, or alternate functionality, including that discussed elsewhere herein, and/or discussed with reference to mobile devices, remote servers, and/or smart infrastructure.

In an aspect, sensor array 526, communication unit 530, and smart vehicle controller 540 may have a similar architecture, implementation, and/or perform similar functions as sensor array 326, communication unit 330, and controller 340, respectively, as previously discussed above with reference to FIG. 3. Therefore, only differences between sensor array 526, communication unit 530, and smart vehicle controller 540, as shown in FIG. 5, and sensor array 326, communication unit 330, and controller 340, as shown in FIG. 3, will be further discussed herein.

For instance, it will be appreciated that some differences between sensor array 526, communication unit 530, and smart vehicle controller 540, as shown in FIG. 5, and sensor array 326, communication unit 330, and controller 340, as shown in FIG. 3, respectively, may be due to differences between applications and design requirements of mobile device s and vehicles. For example, smart vehicle controller 540 may include one or more microprocessors, program memory, RAM, I/O interfaces, etc. However, smart vehicle controller 540 may include faster microprocessors, additional memory, faster memory controllers, etc., than that of controller 340 to account for the additional processing and speed requirements associated with the higher processing functions of vehicles, particularly smart vehicles. To provide another example, smart vehicle controller 540 may include one or more processors specifically designed for adaptive vision processing at high speeds and/or utilizing parallel processing techniques to facilitate autonomous or semi-autonomous driving.

Likewise, sensor array 526 may have additional or alternative sensors and/or meters than sensor array 326. Sensor array 526 may additionally or alternatively include any suitable number and/or type of sensors and/or meters to facilitate autonomous or semi-autonomous driving. Examples of sensors included in sensor array 526 may include, for example, radar systems configured to operate at any suitable number or range of wavelengths (e.g., millimeter-wavelengths), LiDAR, ultrasonic sensors, etc.

Vehicle sensors 545 may include, for example, any suitable number and/or type of sensors and/or meters integrated as part of the vehicle in which smart vehicle control system 500 is installed or otherwise implemented. For example, vehicle sensors 545 may generate one or more sensor metrics or other data that is part of the telematics data that is stored, collected, and/or broadcasted from smart vehicle control system 500 (e.g., via communication unit 530).

In some aspects, vehicle sensors 545 may sample sensor metrics or other information that is included as part of the telematics data, as discussed elsewhere herein, while sensor array 526 may be implemented as one or more sensors associated with autonomous driving functions. Thus, in aspects in which smart vehicle control system 500 is implemented as part of a non-autonomous vehicle, vehicle sensors 545 and sensor array 526 may be implemented as a single sensor array.

Communication unit 530 may be configured to transmit and/or receive any suitable type of data. To accomplish this, communication unit 530 may be implemented with any suitable number and/or type of hardware components such as, for example, one or more transceivers, receivers, transmitters, antennas, ports, etc.

Smart vehicle controller 540 may be configured to operate in conjunction with one or more of vehicle sensors 545, communication unit 530, driving control system 550, and/or sensor array 526 to process and/or analyze data, to store data to one or more memory units associated with smart vehicle controller 540, to retrieve data from one or more memory units associated with smart vehicle controller 540, and/or to perform one or more functions of the various aspects as described herein.

For example, smart vehicle controller 540 and communication unit 530 may facilitate receiving data from and/or sending data to one or more devices, such as one or more mobile computing devices, one or more vehicles, one or more infrastructure components, etc. To facilitate this functionality, smart vehicle controller 540 may be coupled via one or more wired and/or wireless interconnections to one or more other components of smart vehicle control system 500, such as via any suitable number of data and/or address buses, for example. These interconnections are not shown in FIG. 5 for purposes of brevity.

In one aspect, communication unit 530 may be configured to transmit telematics data and/or other data. This data may include, for example, one or more sensor metrics, alert notifications, and/or other telematics-data related messages (e.g., the extent, severity, type, and/or the geographic location of a traffic event or another anomalous condition that has been detected or received). To provide additional examples, the data may include a location of smart vehicle control system 500 or other information generated by vehicle sensors 545 and/or sensor array 526, which may be received by other mobile devices, other smart vehicles, smart infrastructure, and/or external computing devices, as discussed elsewhere herein.

Additionally or alternatively, communication unit 530 may be configured to receive any suitable type of data, such as data generated and/or collected by other smart vehicle control systems 500, as discussed above with respect to data transmissions. For example, communication unit 530 may be configured to receive data transmitted by other mobile devices, other smart vehicles, smart infrastructure, and/or external computing devices, as discussed elsewhere herein.

Again, the telematics data or a telematics data transmission (which may include telematics data and any other suitable type of data, as discussed above) may include information that identifies the nature, severity, and/or area of impact of a travel event or other anomalous condition. This information may thus identify the travel event or other anomalous condition in which the computing device or vehicle has encountered or is presently encountering. Smart vehicle control system 500 may then use such information to identify the travel event at that location and/or to take or direct corrective or preventive action to facilitate safer vehicle travel for the moving vehicle in which computing device 300 is located. For example, smart vehicle control system 500 may generate, display, and/or provide an alert for the driver of the moving vehicle in which smart vehicle control system 500 is located, which is further discussed below.

In one aspect, smart vehicle controller 540 may work in conjunction with communication unit 530 to periodically listen for and/or to periodically broadcast telematics data. For example, smart vehicle controller 540 may periodically listen for a broadcast containing telematics data generated and transmitted from other mobile computing devices, vehicles, external computing devices, and/or smart infrastructure components. Upon detecting a broadcast, smart vehicle controller 540 may download the broadcast to a suitable portion of one or more of its memory units and analyze the telematics data contained therein for potential traffic events, travel events, alerts, messages, etc. Such aspects may be particularly useful, for example, to save power, as continuous listening is not necessary (although possible) but instead may be performed, for example, in accordance with a particular timing schedule.

To provide another example, smart vehicle controller 540 may cause communication unit 530 to periodically broadcast telematics data, which may be received by other mobile computing devices, vehicles, external computing devices, and/or infrastructure components. To provide an illustrative example, the telematics data may be sampled, updated, and/or broadcasted in accordance with a periodically recurring schedule or sampling rate (e.g., five times per second, every second, once every 5 seconds, once every ten seconds, etc.).

When transmitting telematics data, smart vehicle controller 540 may be configured to format the sensor metrics and/or other information generated, collected, and/or measured by vehicle sensors 545 and/or sensor array 526 into a telematics data broadcast, determine whether the telematics data should be updated, and/or broadcast the telematics data. Additionally or alternatively, smart vehicle controller 540 may be configured to analyze the telematics data to identify one or more anomalous conditions (e.g. travel events, traffic events), and/or alerts, to generate one or more messages associated with the telematics data and/or detailing the type and/or extent of an identified anomaly and/or alert, etc.

Furthermore, smart vehicle controller 540 may be configured to broadcast or otherwise direct a transmission of the message via data transmission and/or wireless communication (e.g., via communication unit 530) to another computing device (such as a mobile device, another vehicle, a remote server, smart infrastructure, etc.). As further discussed herein, devices receiving the telematics data and/or message may utilize the telematics data to perform various functions, issue alerts to drivers, etc. In this way, the telematics data and/or messages transmitted by smart vehicle control system 500 may facilitate safer travel for another vehicle and/or another driver.

As discussed above with reference to FIG. 3, the identified anomaly (e.g., a travel event, traffic event, etc.) may be based upon (and/or determined from telematics data that reveals) abnormal traffic conditions, congestion, road construction, and/or weather conditions, etc., and may include any suitable condition that indicates a deviation from normal traffic patterns or otherwise poses a potential hazard or inconvenience to other drivers.

In various aspects, the identified anomaly may be detected by smart vehicle controller 540 based upon an analysis of locally generated or collected telematics data, telematics data received from another computing device via communication unit 530, an analysis of data transmitted with and/or included as part of a telematics data broadcast or transmission, and/or an analysis of one or more received telematics-related messages (e.g., alert notifications).

Similar to other devices described above (e.g., computing device 300), when receiving telematics data, smart vehicle controller 540 may be configured to perform various functions such as issuing alerts to drivers when the telematics data contains a warning message and/or identifying an anomalous condition by analyzing the received telematics data.

For example, smart vehicle controller 540 may execute instructions stored in one or more of its associated memory units to determine or identify whether a travel event exists associated with telematics data received from an originating device or vehicle, a GPS location or other location of the travel event, whether the telematics data includes a message indicating the existence of the travel event, an estimated or actual geographical or temporal scope of the travel event from an analysis of telematics data, etc. The techniques to identify this information may be substantially similar to or identical as those discussed above, for example, with respect to computing device 300 as well as elsewhere herein.

In other words, similar to computing device 300, smart vehicle controller 540 may analyze the telematics data itself and/or any suitable portion of the transmission in which the telematics data is sent to attempt to identify an alert, indication, and/or message regarding a travel event or other anomalous condition that has already been identified by another device. For example, the telematics data (or other data sent with the telematics data as part of a data transmission) may include a message or other information indicating a type of anomalous condition or travel event, when it was detected, and its location.

Driving control system 550 may be implemented with any suitable number and/or type of driving controllers to control the direction, movement, and/or speed of the vehicle in which smart vehicle control system 500 is installed. For example, driving control system 550 may include various drive-by-wire interfaces to facilitate controlling the speed of the vehicle and to turn the vehicle without user input. To provide an additional example, driving control system may include various braking controllers and/or transmission controllers to slow the vehicle and to shift the vehicle into different gears.

In accordance with one aspect, smart vehicle controller 540 may communicate with one or more components of driving control system 550 in response to telematics data, information, and/or messages received via communication unit 530. For example, if the telematics data indicates a road hazard at a certain location and/or in a certain road lane, then smart vehicle controller 540 may issue one or more commands to driving control system 550 to steer the vehicle into a clear lane, thus avoiding the road hazard.

Driving control system 550 may include different types of feedback components and/or control systems based upon the type of vehicle in which smart vehicle control system 500 is implemented or installed. For example, driving control system 550 may include various interfaces and/or control systems to facilitate autonomous driving in conjunction with smart vehicle controller 540. But if smart vehicle control system 500 is implemented in a non-autonomous vehicle (or is implemented as part of an autonomous vehicle but being operated in a non-autonomous mode of operation), driving control system may work in conjunction with smart vehicle controller 540 to receive one or more signals and/or data associated with traditional driving functions performed by a driver of the vehicle (e.g., manual acceleration, steering, braking, etc.).

Regardless of the type of vehicle in which smart vehicle control system 500 is implemented, smart vehicle controller 500 may work in conjunction with driving control system 550 to support any suitable number and/or type of driver feedback. To provide this feedback, driving control system 550 may include any suitable number and/or type of displays, user interfaces, speakers, buzzers, etc.

For example, driving control system 550 may include various feedback components to provide visual and/or auditory feedback regarding the operation of the vehicle and/or information regarding anomalous conditions, alerts, warnings, recommendations, etc., which may be based upon an analysis of telematics data. Again, the telematics data may be received from another computing device (e.g., via communication unit 530) and/or generated and analyzed locally at smart vehicle control system 500.

To provide another example, smart vehicle controller 540 may include one or more memory units configured to store computer readable instructions, cartographic and/or map data, vehicle navigation information, virtual road maps, etc. In various aspects, the one or more memory units associated with smart vehicle controller 540 may be implemented as a non-transitory tangible computer readable media configured to store computer-readable instructions, that when executed by smart vehicle controller 540, cause smart vehicle controller 540 to perform various acts.

In response to user input received via a user interface implemented by driving control system 550, smart vehicle controller 540 may generate, calculate, and/or display travel routes, which may provide navigational guidance to a driver. Furthermore, smart vehicle controller 540 may perform functions associated with the determination of whether an identified anomaly, which has been determined from an analysis of received telematics data from another device, is relevant to the vehicle in which smart vehicle control system 500 is implemented.

This determination of relevance may be made, for example, by comparing a location (e.g., geographic coordinates included in a telematics data transmission) to the current location of smart vehicle control system 500 to determine whether the locations are within a threshold distance of one another. These locations may include, for example, geographic locations defined by GPS coordinates or any other suitable techniques that may adequately identify the location of smart vehicle control system 500 and another vehicle, another device, another smart vehicle control system, smart infrastructure, etc.

The determination may also be made, for example, when the identified anomaly or other abnormal condition is located along a current travel route (e.g., ahead by some threshold distance in a direction of travel on the same road in which the vehicle in which smart vehicle control system 500 is implemented is moving). If so, aspects include smart vehicle controller 540 automatically performing various preventative and/or corrective actions based upon how the relevance of the identified anomaly is determined.

For example, smart vehicle controller 540 may issue a visual and/or audible alert via driving control system 550, issue a visual and/or audible recommendation for the driver of the vehicle associated with smart vehicle control system 500 via driving control system 550 (e.g., a recommendation to take an alternate route, change lanes, slow down, engage all-wheel drive, etc.), calculate and/or display an alternate travel route via driving control system 550 that avoids the location of the identified event, etc.

To provide additional examples, when smart vehicle control system 500 is implemented as part of a vehicle capable of autonomous driving, the corrective or preventive action may include automatically or semi-automatically re-routing the vehicle. In other words, smart vehicle control system 500 may not only calculate and/or receive an alternate route that avoids the location of the identified event, but actively re-route and drive the vehicle to avoid a location or area associated with the identified event.

In some aspects, the preventative and/or corrective action may be issued only when it is determined that an identified anomaly is relevant, and is otherwise not issued. For example, aspects include an identified anomaly that is not along a current route for the vehicle in which smart vehicle control system 500 is implemented not causing an alarm to be sounded and/or the route to be adjusted, even if the location of the anomaly is otherwise nearby. In this way, the preventive or corrective action may alleviate or avoid a negative impact of the abnormal travel condition on the driver and/or the vehicle in which smart vehicle control system 500 is implemented to facilitate safer or more efficient vehicle travel without unnecessarily issuing alerts.

As discussed above with reference to FIG. 3, various aspects include the data generated, collected, and/or received by smart vehicle control system 500 being leveraged to calculate a usage amount in which a user utilizes the telematics data-based risk mitigation or prevention functionality provided by smart vehicle control system 500 while driving. This functionality may include, for example, any of the telematics data collection, generation, transmission, reception, and/or corrective actions described throughout this disclosure. Similarly, smart vehicle controller 540 may calculate various usage metrics regarding a driver utilizing these functions while driving the vehicle (or being in an autonomous vehicle without necessarily driving it) in which smart vehicle control system 500 is implemented.

Again, as discussed above, the usage amount may be time-based or mileage-based. As discussed above, this usage data may be sent to an insurer or other third party via a telematics data transmission or a separate transmission and used to set and/or adjust an insurance policy, premium, or discount for the insured customer.

Exemplary Remote Server

Figure 6:
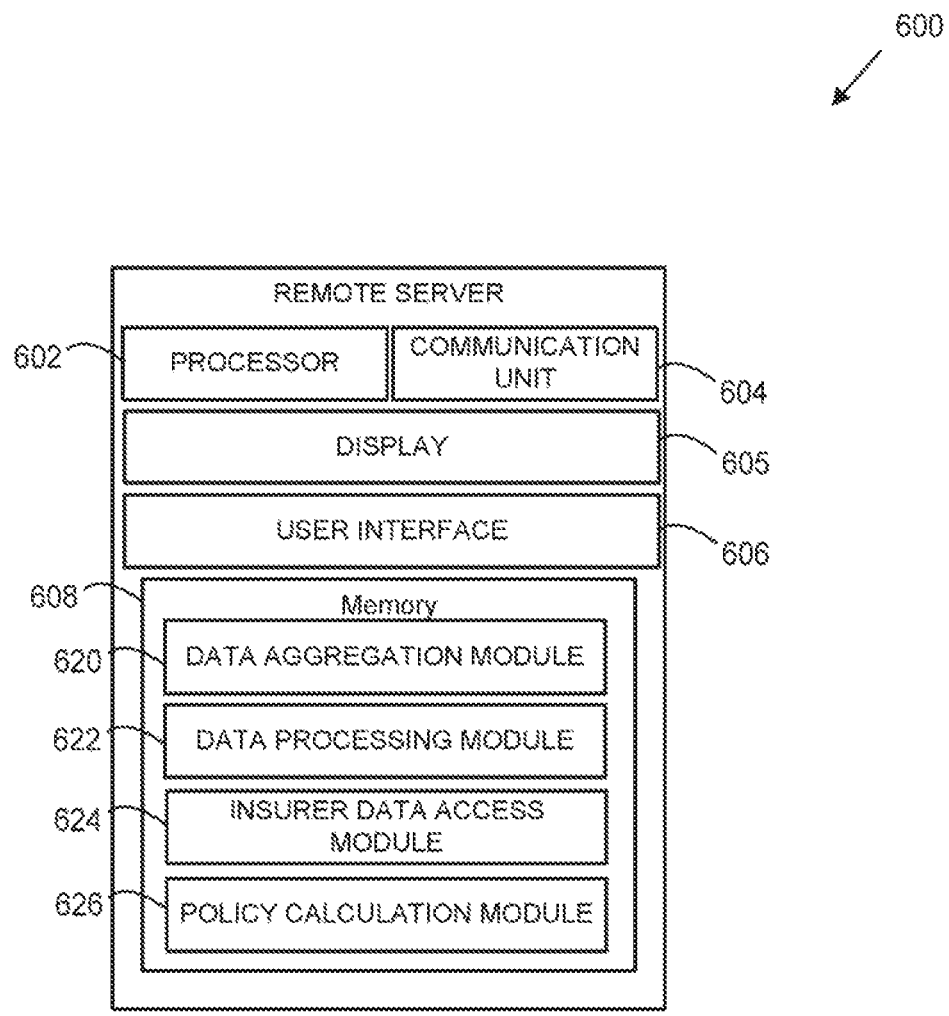
FIG. 6 illustrates a block diagram of an exemplary remote server 600 in accordance with an exemplary aspect of the present disclosure.

FIG. 6 illustrates a block diagram of an exemplary remote server 600 in accordance with an exemplary aspect of the present disclosure. Remote server 600 may be implemented as any suitable computing device. In one aspect, remote server 600 may be an implementation of external computing device 206, for example, as shown in FIG. 2. In an aspect, remote server 600 may include a processor 602, a communication unit 604, a display 605, a user interface 606, and a memory 608. Remote server 600 may include additional, fewer, or alternate components, including those discussed elsewhere herein.

Processor 602 may be implemented as any suitable type and/or number of processors, such as a host processor of remote server 600, for example. To provide additional examples, processor 602 may be implemented as an application specific integrated circuit (ASIC), an embedded processor, a central processing unit (CPU) associated with remote server 600, a graphical processing unit (GPU), etc.

Processor 602 may be configured to communicate with one or more of communication unit 604, display 605, user interface 606, and/or memory 608 via one or more wired and/or wireless interconnections, such as any suitable number of data and/or address buses, for example. These interconnections are not shown in FIG. 5 for purposes of brevity.

Processor 602 may be configured to operate in conjunction with one or more of communication unit 604, display 605, user interface 606, and/or memory 608 to process and/or analyze data, to store data to memory 608, to retrieve data from memory 608, and/or to perform one or more insurance-related and/or telematics data-based functions. For example, processor 602 and communication unit 604 may facilitate receiving data from and/or sending data to one or more devices, such as one or more mobile computing devices 204.1-204.N, one or more vehicles 202.1-202.N, one or more infrastructure components 208, etc.

Communication unit 604 may be configured to facilitate communications between remote server 600 and one or more other devices. For example, in aspects in which remote server 600 is an implementation of external computing device 206, as shown in FIG. 2, communication unit 604 may facilitate communications between external computing device 206 and one or more mobile computing devices 204.1-204.N, one or more vehicles 202.1-202.N, one or more infrastructure components 208, etc.

In various aspects, remote server 600 may be configured to communicate with these other devices in accordance with any suitable number and/or type of communication protocols. Thus, communication unit 604 may be implemented with any suitable hardware, firmware, and/or software to facilitate the various aspects described herein. For example, communication unit 604 may be implemented with any suitable number and/or type of hardware components such as, for example, one or more transceivers, receivers, transmitters, antennas, ports, etc.

In some aspects, remote server 600 may function as a relay, receiving telematics data and/or other data from one or more devices, processing the data, and transmitting the data to other devices. In accordance with such aspects, communication unit 604 may be configured to receive a data transmission or wireless communication containing or including telematics data, which may be generated and transmitted, for example, from a first mobile device (e.g., mobile computing device 204.1 or vehicle 202.1, as shown in FIG. 2). Again, as discussed throughout this disclosure, mobile computing device 204.1 and/or vehicle 202.1 may be associated with a driver when appropriate (e.g., when vehicle 202.1 is a non-autonomous vehicle or an autonomous vehicle being operated in a non-autonomous fashion).

Continuing this example, once communication unit 604 receives the telematics data and/or other data from mobile computing device 204.1 or vehicle 202.1, processor 702 may analyze the data, determine whether a travel event or anomalous condition exists, determine the location of any identified travel events, and cause communication unit 604 to transmit a travel event-related data transmission or wireless communication (e.g., a warning message, notification, and/or the telematics data and/or other data) to another mobile computing device or vehicle (e.g., mobile computing device 204.2 or vehicle 202.2, as shown in FIG. 2). The techniques utilized by remote server 600 to identify travel events may be similar to those previously explained with reference to computing device 300, and/or smart vehicle control system 500, as shown in FIGS. 3 and 5, respectively.

Upon receiving the data transmission or wireless communication at the second mobile device or second vehicle (e.g., mobile computing device 204.2 or vehicle 202.2) the mobile device or vehicle may use the telematics data, notification, message, etc., to take corrective or preventive action. In this way, remote server 600 may enable safer vehicle travel for a second driver (or vehicle) based upon the telematics data associated with a first driver (or vehicle).

Furthermore, because telematics data and/or a telematics data transmission received by remote server 600 may include geographic location information and/or other information detailing the type of travel event, the area of impact, severity, length of time over which the event has elapsed, etc., remote server 600 may also determine the GPS location or other location of the travel event and/an estimated or actual geographical or temporal scope of the travel event. Again, the techniques to identify this information may be substantially similar to or identical as those discussed above, for example, with respect to computing device 300 and/or smart vehicle control system 500 as well as elsewhere herein.

Display 605 may be implemented as any suitable type of display and may facilitate user interaction with remote server 600 in conjunction with user interface 606. For example, display 605 may be implemented as a capacitive touch screen display, a resistive touch screen display, etc. In various aspects, display 605 may be configured to work in conjunction with processor 602 and/or user interface 606 to display collected telematics data received from one or more mobile computing devices and/or vehicles, to display the result of various insurance-related calculations, to display the location of one or more mobile computing devices and/or vehicles, to display insurance profile data and/or other information associated with an insurance policy and/or an insured customer, to provide a graphical user interface (GUI) to facilitate the viewing, adjustment, and/or accessing of insurance-related data, etc.

User-interface 606 may be implemented as any suitable device configured to collect user input, such as a "soft" keyboard displayed on display 605, a keyboard attached to remote server 600, an external keyboard communicating via a wired or a wireless connection (e.g., a BLUETOOTH keyboard), an external mouse, etc.

In some aspects, remote server 600 may perform various tasks automatically and without user intervention. For example, as discussed herein, remote server 600 may receive telematics data from various devices, process the telematics data, relay a telematics data transmission, and/or perform various insurance-related calculations without user interaction with remote server 600. Thus, in accordance with such aspects, display 605 and/or user interface 606 may be unnecessary. In other words, display 605 and/or user interface 606 may be omitted or, if implemented by remote server 600, remain unused while such automated tasks are performed.

In various aspects, memory 608 may be implemented as a non-transitory tangible computer readable media configured to store computer-readable instructions, that when executed by processor 602, cause processor 602 to perform various acts. Program memory 608 may store one or more modules, which may be executed by processor 602 in conjunction with one or more other hardware or software components of remote server 600 to facilitate the execution of one or more functions related to the various aspects, examples of which are further discussed below.

Data aggregation module 620 may include instructions to facilitate receiving telematics data or other data from one or more devices, such as one or more mobile computing devices 204.1-204.N, one or more vehicles 202.1-202.N, and/or one or more infrastructure components 208, for example, as shown in FIG. 2. Data aggregation module 620 may include instructions that, when executed by processor 602, enable processor 602 to process data sent by one or more other devices, to identify a device and/or user associated with each device, and/or to store the telematics data in any suitable portion of memory 608 and/or in another suitable storage device (which may be part of remote server 600 or another external computing device in communication with remote server 600).

For example, processor 602 may execute instructions stored in data aggregation module 620 to receive broadcasted telematics data transmissions from one or more mobile computing devices, to identify a user of each the mobile computing devices, and store this information in a manner such that each user may be correlated with each respective mobile computing device. To provide an illustrative example, mobile computing device 204.1 may broadcast telematics data indicative of the operation and/or motion of vehicle 202.1, which is received by remote server 600 via communication unit 604. Additionally or alternatively, mobile computing device 204.1 may transmit various messages, warnings, notifications, location data, a username associated with an insured driver using mobile computing device 204.1, usage data associated with when the Telematics App is executed on mobile computing device 204.1, data indicative of a detected anomalous travel event, condition, or other hazard at the location associated with mobile computing device 204.1 and/or vehicle 202.1, etc.

In one aspect, processor 602 may work in conjunction with communication unit 604 to periodically listen for and/or to periodically broadcast telematics data. For example, processor 602 may periodically listen for a broadcast containing telematics data generated and transmitted from other mobile computing devices, vehicles, external computing devices, and/or infrastructure components. Upon detecting a broadcast, processor 602 may download the broadcast to a suitable portion of memory 608 and analyze the telematics data contained therein for potential traffic events, travel events, alerts, messages, etc. Such aspects may be particularly useful, for example, to save power, as continuous listening is not necessary (although possible) but instead may be performed, for example, in accordance with a particular timing schedule.

To provide another example, processor 602 may cause communication unit 604 to periodically broadcast telematics data, which may be received by other mobile computing devices, vehicles, external computing devices, and/or infrastructure components. To provide an illustrative example, the telematics data may be sampled, updated, and/or broadcasted in accordance with a periodically recurring schedule or sampling rate (e.g., five times per second, every second, once every 5 seconds, once every ten seconds, etc.).

Aspects include remote server 600, via execution of instructions stored in data aggregation module 620 by processor 602, storing any suitable type of data received from any suitable number and/or type of devices. This data may be stored in a manner such that a user associated with each device (e.g., an insured driver), the device itself, and the telematics data or other data transmitted by the device (and the time when such data was transmitted) may all be identified and correlated to one another for additional processing, as further discussed below.

Data processing module 622 may include instructions that, when executed by processor 602, enable processor 602 to process data received by remote server 600 from one or more other devices, as discussed above and elsewhere herein. For example, processor 602 may execute instructions stored in data processing module 622 to identify an insured customer associated with a device (e.g., a mobile computing device or vehicle transmitting telematics data) and/or to determine whether the insured customer has given consent to monitoring and/or tracking of time-based or mileage-based usage of the Telematics App installed on the insurance customer's mobile device while the insurance customer is driving an insured vehicle. When consent is verified, aspects include remote server 600 analyzing the telematics data to calculate a time-based or a mileage-based usage of the Telematics App, as previously discussed with reference to FIG. 3.

In the present aspect, the determination of whether an insured customer has provided consent may be performed using any suitable number and/or type of techniques. For example, the Telematics Application may include instructions that, as a condition to its installation, require an insured customer to provide such consent. To provide another example, the insured customer's insurance profile may maintain an indication that this consent was provided, which may be accessed by remote server 600 for verification.

Data processing module 622 may additionally or alternatively facilitate remote server 600 determining whether an insured customer associated with a mobile computing device and/or vehicle has a Telematics Application installed. For example, the data received from a mobile computing device may indicate the insurance customer's logon username but, when correlated to data received from the mobile computing device, indicates a lack of telematics data transmissions.

To provide another example, upon installation of the telematics application, the mobile computing device may communicate with remote server 600 via one or more application programming interfaces (APIs). Upon doing so, remote server 600 may use data transmitted in the API communications (e.g., various flags, indicators, etc.) to determine whether the insurance customer has installed the Telematics Application on her respective mobile computing device.

Insurer data access module 624 may include instructions to facilitate remote server 600 accessing, reading, storing, and/or updating insurer data. For example, as discussed above with reference to FIG. 3, an insurer may maintain stored insurer profile data, which may include, for example, insurance policy numbers, a description and/or listing of insured assets, vehicle identification numbers of insured vehicles, addresses of insured structures, contact information, premium rates, one or more qualifying discounts, etc.

In various aspects, some portions of the insurer data may be secured by the insurer as proprietary information, while other aspects of the insurer data may be made available to authorized users via the Internet (e.g., those providing the correct logon credentials). Processor 602 may execute instructions stored in insurer data access module 624 to allow parties access to insurer data in accordance with the appropriate level of access established by the insurer.

In one aspect, processor 602 may execute instructions stored in insurer data access module 624 to facilitate accessing this data and/or manipulating this data. For example, an insured customer may be associated with an insurance profile including an automotive insurance policy having a corresponding premium, which may be the result of the insured customer qualifying for various discounts. As discussed above with reference to FIG. 3, the various discounts may be provided by an insurer based upon the usage amount (e.g., time-based or mileage-based) whereby the insured customer uses the Telematics Application, whether the insured customer has the Telematics Application installed, etc. In an aspect, processor 602 may execute instructions stored in insurer data access module 624 to utilize an insured customer's logon credentials to access this data and/or to make this data available for various insurance-related calculations, as discussed below and elsewhere herein.

Policy calculation module 626 may include instructions to facilitate remote server 600 calculating insurance-related pricing related to one or more insurance policies. This insurance-related pricing may be based upon, for example, the telematics data and/or an insured customer's usage of a Telematics Application. In the event that processor 602, when executing instructions stored in policy calculation module 626, results in a change in the stored insurer profile data, processor 602 may additionally execute instructions stored in insurer data access module 624 to update the stored insurer profile data with updated insurance pricing. Additionally or alternatively, processor 602 may execute instructions stored in insurer data access module 624 to update other insurer profile data such as discount information, telematics data, Telematics Application usage information, etc.

To provide an illustrative example, processor 602 may execute instructions stored in policy calculation module 626 to analyze telematics data received over some period of time for an identified insured customer. Remote server 600 may analyze the telematics data using any suitable number and/or type of analysis to appropriately allocate risk associated with the insurance customer based upon the telematics data (e.g., whether the insured customer regularly drives in excess of the posted speed limit, drives recklessly, drives or parks in areas associated with high crime rates and/or high accident rates, etc.). Based upon the allocated risk, processor 602 may execute instructions stored in policy calculation module 626 to calculate a suitable insurance premium, determine whether the insured customer has lost one or more discounts, is eligible for additional safe-driving discounts, etc.

To provide another illustrative example, processor 602 may execute instructions stored in policy calculation module 626 to calculate, update, and/or adjust an insurance policy premium or discount based upon the time-based usage or mileage-based usage of the Telematics Application by the insurance customer's mobile device. In other words, remote server 600 may calculate a usage amount associated with the insured customer's usage of the Telematics Application while the customer drove an insured vehicle, and update or adjust the customer's insurance policy premium to provide a reduced cost for increased usage of the Telematics application. In this way, the use of the Telematics Application may facilitate rewarding risk-averse drivers and encourage usage of risk-mitigation or prevention technology.

Exemplary Smart Infrastructure Component

Figure 7:
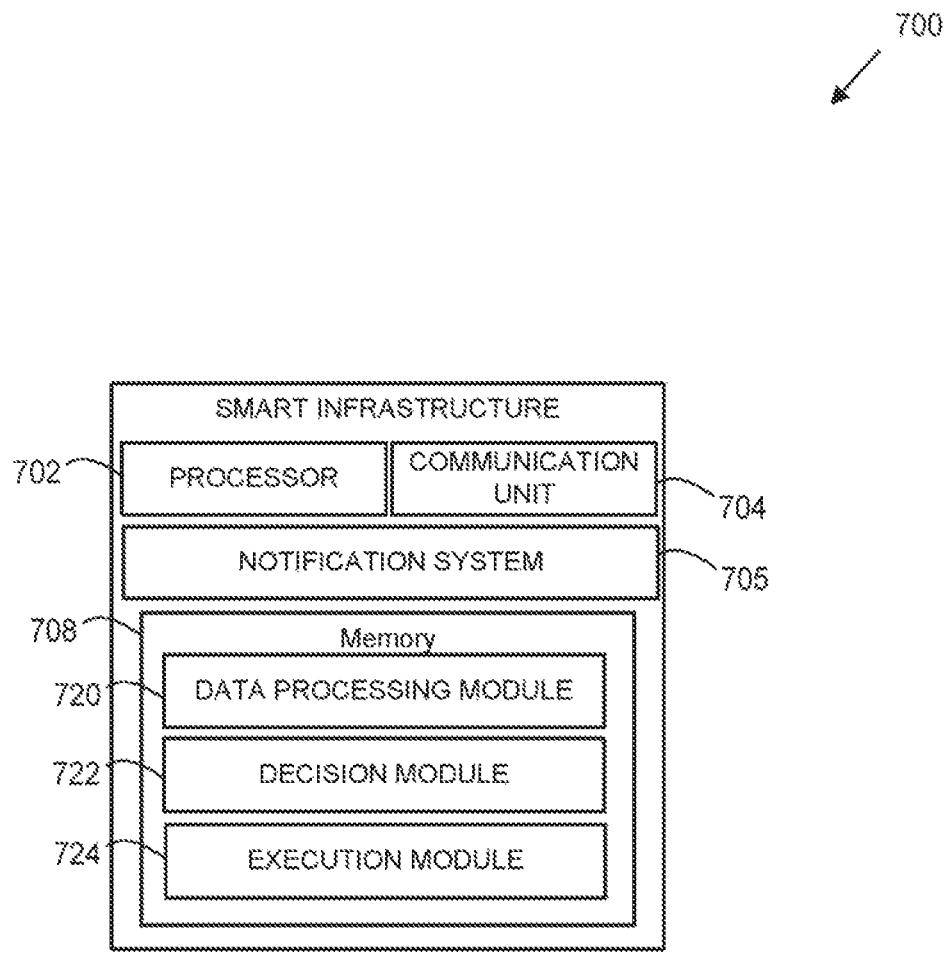
FIG. 7 illustrates a block diagram of an exemplary smart infrastructure component 700 in accordance with an exemplary aspect of the present disclosure.

FIG. 7 illustrates a block diagram of an exemplary smart infrastructure component 700 in accordance with an exemplary aspect of the present disclosure. In the present aspect, smart infrastructure component 700 may be implemented as any suitable computing device, such as a computing device that is integrated as part of a smart roadside infrastructure, billboard, sign, railroad crossing lights, etc., to facilitate the receipt and/or transmission of telematics data and/or other data. Additionally or alternatively, smart infrastructure component 700 may facilitate various functions to warn and/or notify other drivers and/or vehicles based upon received telematics data and/or data included in telematics data transmissions. In one aspect, smart infrastructure component 700 may be integrated as part of infrastructure component 208, as shown in FIG. 2.

In one aspect, smart infrastructure component 700 may include a processor 702, a communication unit 704, a notification system 705, and a memory 708, one or more of which may be configured to communicate with one another to receive data from, and/or send data to, one another. Smart infrastructure component 700 may include additional, fewer, or alternate components, including those discussed elsewhere herein. Furthermore, smart infrastructure component 700 may include additional, less, or alternate functionality, including that discussed elsewhere herein, and/or discussed with reference to mobile devices, remote servers, and/or smart infrastructure.

In an aspect, processor 702, communication unit 704, notification system 705, and memory 708 may have a similar architecture, implementation, and/or perform similar functions as processor 602, communication unit 604, display 605, and memory 608, respectively, as previously discussed above with reference to remote server 600, as shown in FIG. 6. Therefore, only differences between processor 702, communication unit 704, notification system 705, and memory 708 (as shown in FIG. 7), and processor 602, communication unit 604, display 605, and memory 608 (as shown in FIG. 6), will be further discussed herein.

For instance, it will be appreciated that some differences between the components of smart infrastructure component 700 and remote server 600 may be due to differences between applications and design requirements of infrastructure components and servers. For example, communication unit 704 may be configured to receive data from less devices than remote server 600 and, as a result, communication unit 704 may be configured to receive and/or transmit data using less bandwidth than communication unit 604 of remote server 600. To provide another example, processor 702 may be configured to perform less complex tasks when integrated as part of smart infrastructure component 700 as opposed to processor 602, which may be implemented as part of remote server 600. Thus, although processor 702 may be configured to facilitate any suitable functions of the aspects described herein with reference to smart infrastructure component 700, processor 702 may do so with lower performance compared to processor 602.

Processor 702 may be configured to communicate with one or more of communication unit 604, display 605, user interface 606, and/or memory 608 via one or more wired and/or wireless interconnections, such as any suitable number of data and/or address buses, for example. These interconnections are not shown in FIG. 5 for purposes of brevity. Furthermore, processor 702 may be configured to operate in conjunction with one or more of communication unit 704, notification system 705, and memory 708 to process and/or analyze data, to store data to memory 708, to retrieve data from memory 708, and/or to perform one or more telematics data-based functions. For example, processor 702 and communication unit 704 may facilitate receiving telematics data from and/or sending telematics data to one or more devices, such as one or more mobile computing devices, one or more vehicles, one or more remote servers, etc.

Communication unit 704 may be configured to facilitate communications between smart infrastructure component 700 and one or more other devices. For example, in aspects in which smart infrastructure component 700 is an implementation of infrastructure component 208, as shown in FIG. 2, communication unit 704 may facilitate communications between infrastructure component 208 and one or more mobile computing devices 204.1-204.N, one or more vehicles 202.1-202.N, one or more remote servers 206, etc.

In various aspects, smart infrastructure component 700 may be configured to communicate with these other devices in accordance with any suitable number and/or type of communication protocols. Thus, in various aspects, communication unit 704 may be implemented with any suitable hardware, firmware, and/or software to facilitate the various aspects described herein. For example, communication unit 704 may be implemented with any suitable number and/or type of hardware components such as, for example, one or more transceivers, receivers, transmitters, antennas, ports, etc.

Similar to other devices described herein (e.g., computing device 300, smart vehicle control system 500, etc.), in some aspects, smart infrastructure component 700 may function as a relay, receiving telematics data and/or other data from one or more devices, processing and/or analyzing the data, determining whether a travel event or anomalous condition exists, determining the location of any identified travel events, and causing communication nit 704 to transmit a travel event-related data transmission or wireless communication (e.g., a warning message, notification, and/or the telematics data and/or other data) to another mobile computing device or vehicle (e.g., mobile computing device 204.2 or vehicle 202.2, as shown in FIG. 2). The techniques utilized by smart infrastructure component 700 to identify travel events may be similar to those previously explained with reference to computing device 300, smart vehicle control system 500, and/or remote server 600, as shown in FIGS. 3, 5, and 6, respectively. These techniques are further discussed below.

Again, upon receiving the data transmission or wireless communication at the second mobile device or second vehicle (e.g., mobile computing device 204.2 or vehicle 202.2) the mobile device or vehicle may use the telematics data, notification, message, etc., to take corrective or preventive action. In this way, smart infrastructure component 700 may enable safer vehicle travel for a second driver (or vehicle) based upon the telematics data associated with a first driver (or vehicle).

In one aspect, processor 702 may work in conjunction with communication unit 704 to periodically listen for and/or to periodically broadcast telematics data. For example, processor 702 may periodically listen for a broadcast containing telematics data generated and transmitted from other mobile computing devices, vehicles, external computing devices, and/or infrastructure components. Upon detecting a broadcast, processor 702 may download the broadcast to a suitable portion of memory 708 and analyze the telematics data contained therein for potential traffic events, travel events, alerts, messages, etc. Such aspects may be particularly useful, for example, to save power, as continuous listening is not necessary (although possible) but instead may be performed, for example, in accordance with a particular timing schedule.

To provide another example, processor 702 may cause communication unit 704 to periodically broadcast telematics data (e.g., when relaying data), which may be received by other mobile computing devices, vehicles, external computing devices, and/or infrastructure components. To provide an illustrative example, the telematics data may be sampled, updated, and/or broadcasted in accordance with a periodically recurring schedule or sampling rate (e.g., five times per second, every second, once every 5 seconds, once every ten seconds, etc.).

In other aspects, smart infrastructure component 700 may function to provide warning messages, notifications, or perform other preventive or corrective actions, such as those discussed above with reference to computing device 300, smart vehicle control system 500, and/or remote server 600, for example, as shown in FIGS. 3, 5, and 6, respectively. Therefore, notification system 705 may be implemented with any suitable number and/or type of visual, auditory, and/or tactile system to effectively warn other drivers and/or vehicles of identified anomalous conditions indicated by received telematics data and/or other data.

For example, if smart infrastructure component 700 is implemented as a billboard display, notification system 705 may include a display configured to indicate the type of identified anomalous condition and its location (e.g., "left lane blocked 1 mile ahead," "accident 2 miles ahead—use alternate route," etc.).

To provide another example, if smart infrastructure component 700 is implemented as a road construction sign, then notification system 705 may include one or more displays and/or warning signals to indicate the type of an identified anomalous condition and its location.

To provide yet another example, if smart infrastructure component 700 is implemented as a smart stop light, then notification system 705 may include the traffic lights that change their timing patterns upon detecting heavy traffic flow in an attempt to alleviate the heavy traffic conditions.

Memory 708 may include a data processing module 720, a decision module 722, and an execution module 724. Memory 708 may be configured as one or more memory units configured to store computer readable instructions, cartographic and/or map data, vehicle navigation information, virtual road maps, etc. In one aspect, memory 708 may be implemented as a non-transitory, computer readable media. Memory 708 may store one or more modules, which may include computer readable instructions that, when executed by processor 702, facilitate the various aspects as described herein.

For example, data processing module 720 may include instructions that, when executed by processor 702, cause smart infrastructure component 700 to facilitate similar functions as those previously described with reference to the execution of data software applications 344 and/or one or more software routines 352 by controller 340, as shown in FIG. 3.

Upon processor 702 executing instructions stored in data processing module 720, smart infrastructure component 700 may analyze received telematics data to automatically identify or determine whether a travel event exists. That is, smart infrastructure component 700 may determine whether received telematics data (or a transmission including telematics data and/or other data) indicates the existence of a travel event using similar techniques as described with reference to computing device 300, for example, and elsewhere herein.

Furthermore, because telematics data and/or a telematics data transmission received by smart infrastructure component 700 may include geographic location information and/or other information detailing the type of travel event, the area of impact, severity, length of time over which the event has elapsed, etc., smart infrastructure component 700 may also determine the GPS location or other location of the travel event and/an estimated or actual geographical or temporal scope of the travel event. Again, the techniques to identify this information may be substantially similar to or identical as those discussed above, for example, with respect to computing device 300, smart vehicle control system 500, remote server 600, and/or elsewhere herein.

Based upon various conditions being satisfied, processor 702 may take different types of actions once the travel event, location of the travel event, and/or geographical or temporal extent of the travel event are identified. To determine whether such conditions are met and/or which actions to take, processor 702 may execute instructions stored in decision module 722 and execution module 724, respectively.

For example, as discussed above, in some aspects smart infrastructure component 700 may relay received telematics data to other devices. In other aspects, smart infrastructure component 700 may, once a travel event is identified, relay various notifications, warnings, messages, etc., to one or more other devices. In still other aspects, smart infrastructure component 700 may take corrective or preventive action locally in addition to or as an alternative to these other functions.

Therefore, decision module 722 may include instructions that, when executed by processor 702, cause processor 702 to determine the appropriate action when a travel event is identified and/or when telematics data or other data is received. This decision may be based on, for example, the type of infrastructure component in which smart infrastructure component 700 is implemented.

To provide an illustrative example, if smart infrastructure component 700 is implemented as roadside construction sign, smart infrastructure component 700 may be programmed or otherwise configured to display alerts, warnings, and/or other messages of travel events as they are identified. However, if smart infrastructure component 700 is implemented as a smart infrastructure component lacking a display unit, then smart infrastructure component 700 may relay telematics data and/or other data and/or transmit messages notifying other devices of an identified travel event without generating a local alert or notification.

Additionally or alternatively, instructions stored in decision module 722 may facilitate smart infrastructure component 700 determining whether an identified travel event is relevant to another device and transmitting an alert notification (or the telematics data and/or other data) only when the travel event is relevant. For example, smart infrastructure component 700 may utilize any suitable techniques to determine relevance, as discussed above with reference to computing device 300 and elsewhere herein. Again, examples of relevant conditions may be based upon a geographic relationship between vehicles (identified from received telematics data transmissions) and/or route information (e.g., using a log of geographic location information from received telematics data transmissions compared to map data, vehicle navigation information, virtual road maps, etc., stored in memory 708).

Furthermore, once a decision is made regarding the type of function to perform when a travel event is identified, the specific type of action to execute may be determined via execution of instructions stored in execution module 724 via processor 702. Similar to the instructions stored in decision module 722, the instructions stored in execution module 724 may be customized or otherwise tailored to the type of device in which smart infrastructure component 700 is implemented. For example, the instructions stored in execution module 724 may, when executed by processor 702, facilitate communication unit 702 relaying telematics data and/or other data, transmitting alert notifications, causing a local notification to be displayed, cause processor 702 to control the execution of various electromechanical functions (e.g., railroad crossing gates to lower), etc.

Exemplary Smart Infrastructure or Remote Server

Figure 8:
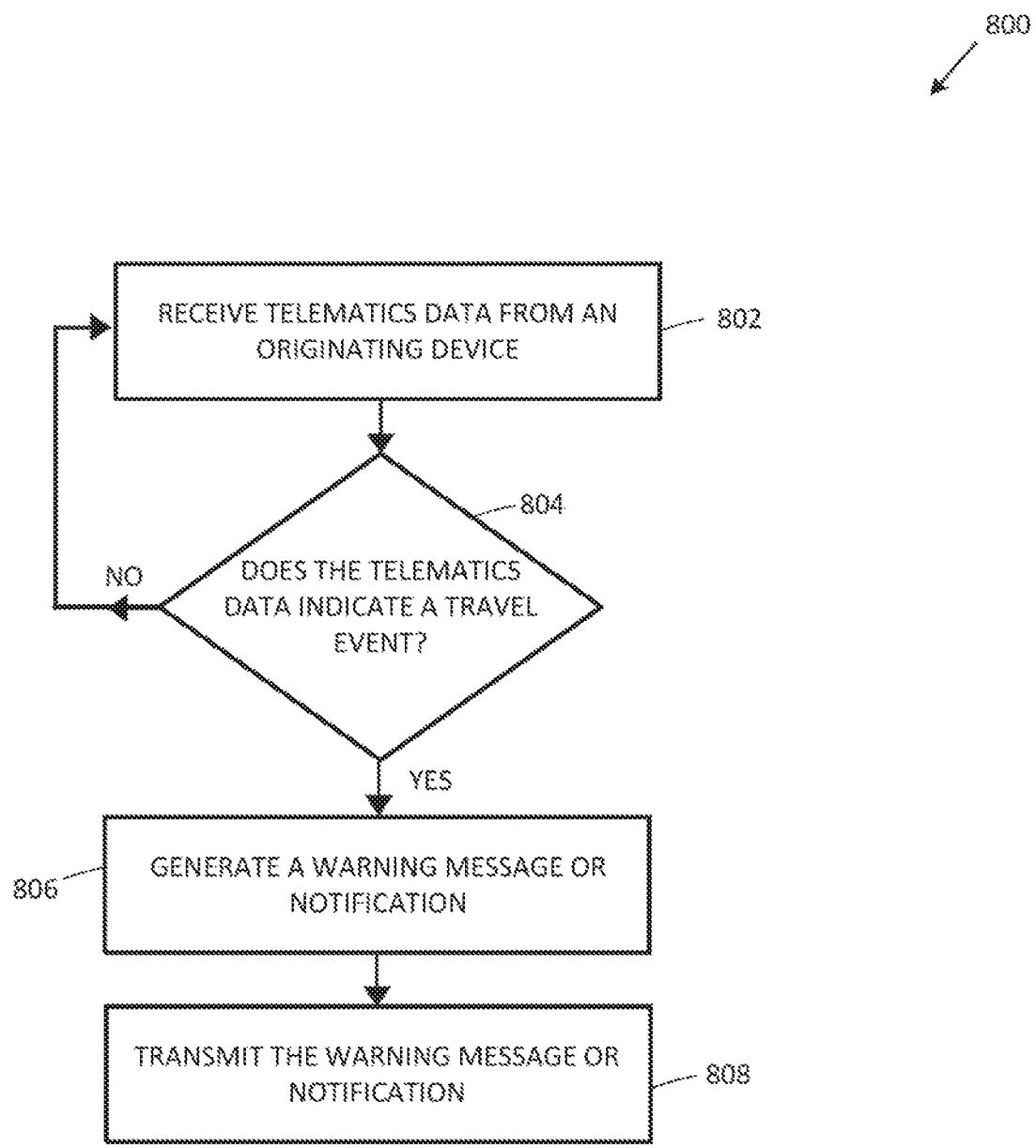
FIG. 8 illustrates an exemplary computer-implemented method 800 for receiving, analyzing, and/or broadcasting telematics and/or other data at or from an intermediary computing device to facilitate safer driving.

FIG. 8 illustrates an exemplary computer-implemented method 800 for receiving, analyzing, and/or broadcasting telematics and/or other data at or from an intermediary computing device to facilitate safer driving. Various devices are described herein to facilitate receiving telematics data and/or other data and analyzing this data to determine whether corrective or preventive action should be taken. As described herein, telematics data may be generated locally at a particular originating device (e.g., computing device 300, smart vehicle control system 500, remote server 600, smart infrastructure component 700, etc.) and/or received at a destination device from another device, which may include the originating device or another intermediary device.

In other words, as discussed throughout the disclosure, any of the devices described herein (e.g., computing device 300, smart vehicle control system 500, remote server 600, smart infrastructure component 700, etc.), which may be configured to receive telematics data and/or other data from an originating device, and/or analyze locally generated telematics data and/or data received from another device, may additionally be configured to relay telematics data and/or other data, messages, alert notifications, etc., to a destination device. When doing so, the relaying device may be referred to as an intermediary or intermediate device.

In the present aspect, the method 800 may be implemented by any suitable computing device (e.g., external computing device 206, as shown in FIG. 2, computing device 300, as shown in FIG. 3, smart vehicle control system 500, as shown in FIG. 5, remote server 600, as shown in FIG. 6, smart infrastructure component 700, as shown in FIG. 7, etc.). In one aspect, the method 800 may be performed by one or more processors, applications, and/or routines. The method 800 may include additional, fewer, or alternate actions, including those discussed elsewhere herein.

The method 800 may start when one or more processors receive telematics data from an originating device (block 802). The originating device may include, for example, a mobile device located in a vehicle, a smart vehicle control system integrated as part of a vehicle, a remote server, a smart infrastructure component, etc. Again, as discussed herein, the telematics data may include, for example, any suitable type of information that may be used to identify various anomalous conditions, events, inconveniences, hazards, etc. (block 802).

The method 800 may include one or more processors associated with a device receiving the telematics data (e.g., an intermediary device) analyzing the telematics data to determine whether a travel event exists (block 804). Again, the travel event may include an event at any location, area, and/or region that may present a potential hazard and/or an inconvenience to other drivers, such as anomalous travel events, anomalous travel conditions, weather-related phenomena, extreme weather conditions, high traffic conditions, traffic congestion, road construction, etc., as well as other examples that are discussed throughout the disclosure.

For example, method 800 may include one or more processors of the intermediary device analyzing the telematics data to determine whether a notification has been received indicating the existence of an abnormal travel event at some location (block 804). In other words, the intermediary device may analyze the telematics data itself and/or any suitable portion of the transmission in which the telematics data is sent to attempt to identify an alert, indication, and/or message regarding an abnormal travel event that has already been identified by an originating device (block 804).

The method 800 may include one or more processors of the intermediary device determining whether the telematics data (block 802) indicates a travel event that is relevant to or otherwise presents an issue to other drivers or vehicles (block 804). As discussed throughout the disclosure, this determination may be made in accordance with any suitable techniques. For example, the intermediary device may compare the location of the travel event to the current location of a destination vehicle. If these two locations are within a threshold or predetermined distance of one another, the intermediary device may identify the abnormal travel event as one that may present an issue to the destination vehicle or driver (block 804).

To provide another example, the location of the travel event may be compared to a route or road upon which the destination vehicle is currently traveling. If the location of the travel event is on the road or along the route on which the destination vehicle is travelling (e.g., ahead and in a direction of travel on the same road in which the vehicle is moving), then the intermediary device may identify the travel event as one that may present an issue to the destination vehicle or driver (block 804).

If the travel condition is relevant to the destination device or otherwise presents an issue, aspects include one or more processors of the to the intermediary device generating a warning message or notification (block 806). Otherwise, method 800 may revert back to continuing to receive telematics data from the originating device (or monitoring for such transmissions) (block 802).

The method 800 may include one or more processors of the intermediary device generating a warning message or notification (block 806). Again, the warning message or notification may be based upon the type of intermediary device and/or the capabilities of the intermediary device. For example, if the intermediary device is implemented as a mobile computing device located in a vehicle or a smart vehicle control system, the warning message or notification may include generating an audible, visual, and/or tactile alert for the driver in which the intermediary device is located (block 806). To provide another example, if the intermediary device is implemented as a smart infrastructure component, then the warning message or notification may be a billboard display message, a roadside construction sign message, etc. (block 806).

The method 800 may include one or more processors of the intermediary device transmitting the warning message or notification (block 808). This may include, for example, the intermediary device relaying the notification and/or message using any suitable number and/or type of communication protocols to a destination device (block 808). Upon receiving the notification and/or message, the destination device may take the appropriate preventive or corrective action (e.g., generating an alternate route that avoids the location of the travel event, generating or determining an alert, re-routing a vehicle, etc.) (block 808).

Exemplary Remote Server

In one aspect, a computer server (or smart infrastructure) configured to use telematics data associated with a first driver to facilitate safer vehicle travel for a second driver may be provided. The computer server may include (1) a communication unit configured to receive telematics data via wireless communication and/or data transmission, the telematics data being generated and transmitted from a first mobile device and/or first smart vehicle associated with a first driver; (2) a memory unit configured to store vehicle navigation information, virtual road maps, and/or computer-readable instructions; and (3) a processor configured to access the memory unit and to automatically identify or determine: (i) a travel or traffic event associated with the first mobile device and/or first vehicle, (ii) a Global Positioning System (GPS) location or other location of the travel event, and (iii) an estimated or actual geographical or temporal scope of the travel event from computer analysis of the telematics data, the processor further being configured to generate a travel event-related data transmission or wireless communication associated with or detailing the travel event, or location or extent thereof. The communication unit may be further configured to transmit the travel event-related data transmission or wireless communication to a second mobile device or second vehicle associated with the second driver to facilitate the second mobile device or second vehicle taking corrective action to enable safer vehicle travel for the second driver based upon the telematics data associated with the first driver.

The telematics data may include data that is indicative of a speed, acceleration, deceleration, location, and/or lane information associated with the first mobile device or the first vehicle. Additionally or alternatively, the telematics data may include data that is indicative of a time, braking, acceleration, left turn, right turn, heading, GPS speed, GPS latitude and longitude, gyroscope, battery level, and/or telephone usage information or data associated with, the first mobile device or the first vehicle. Thus, the travel event may be based upon or determined from, for example, the telematics data, which may reveal vehicle conditions, traffic, congestion, road construction, and/or weather conditions, etc.

The preventive or corrective action taken by the second mobile device or second vehicle may include, for example, (i) generating or determining an alert; (ii) presenting a visual alert on a display or display screen associated with the second mobile device or the second vehicle; (iii) providing an audible alert; (iv) generating, determining, or receiving an alternate travel route that avoids a GPS location of the travel event; (v) presenting the alternative travel route on a display or display screen for use by the driver; and/or (vi) automatically directing the second vehicle to autonomously take or follow the alternative travel route.

Furthermore, the second mobile device or second vehicle may presented the alert only after the second mobile device or second vehicle determines that the travel event is relevant to the second vehicle. This relevance may be determined, for example, via a determination that a location of the travel event is in the vicinity or within a predetermined distance of the second vehicle and along a route that the second vehicle is presently traveling.

Additionally or alternatively, the processor may be further configured to listen for a telematics data-related wireless communication or data transmission, and to store associated telematics data received via the communication unit in the memory unit when the telematics data-related wireless communication or data transmission is detected or within range. In addition, the communication unit may be further configured to relay or otherwise re-transmit the telematics data or the telematics data-related wireless communication or data transmission to other listening devices, including other vehicles, mobile devices, and/or smart infrastructure, for example.

The computer server and/or smart infrastructure may include additional, fewer, and/or alternate components (and functionality), including those discussed elsewhere herein.

Exemplary Smart Road-Side Infrastructure

In another aspect, a smart infrastructure component configured to use telematics data from a first driver to facilitate safer vehicle travel for a second driver may be provided. The smart infrastructure component may include (1) a communication unit configured to receive a data transmission or wireless communication containing or including telematics data, the telematics data being generated and transmitted from a first mobile device or a first vehicle associated with the first driver; (2) a memory unit configured to store vehicle navigation information, virtual road maps, and computer-readable instructions; and (3) a processor configured to access the memory unit to automatically identify or determine: (i) a travel event; (ii) a Global Positioning System (GPS) location or other location of the travel event; and (iii) an estimated or actual geographical or temporal scope of the travel event from computer analysis of the telematics data, the processor further being configured to generate a travel event-related data transmission or wireless communication associated with or detailing the travel event, or location or extent thereof. The communication unit may be further configured to transmit the travel event-related data transmission or wireless communication to a second mobile device and/or second vehicle associated with the second driver to facilitate the second mobile device or second vehicle taking corrective action to enable safer vehicle travel for the second driver based upon the telematics data associated with the first driver.

Again, the telematics data may include data that is indicative of a speed, acceleration, deceleration, location, and/or lane information associated with the first mobile device or the first vehicle. Additionally or alternatively, the telematics data may include data that is indicative of a time, braking, acceleration, left turn, right turn, heading, GPS speed, GPS latitude and longitude, gyroscope, battery level, and/or telephone usage information or data associated with, the first mobile device or the first vehicle. Thus, the travel event may be based upon or determined from, for example, the telematics data, which may reveal vehicle conditions, traffic, congestion, road construction, and/or weather conditions, etc.

Furthermore, as discussed above and elsewhere herein, the preventive or corrective action taken by the second mobile device or second vehicle may include, for example, (i) generating or determining an alert; (ii) presenting a visual alert on a display or display screen associated with the second mobile device or the second vehicle; (iii) providing an audible alert; (iv) generating, determining, or receiving an alternate travel route that avoids a GPS location of the travel event; (v) presenting the alternative travel route on a display or display screen for use by the driver; and/or (vi) automatically directing the second vehicle to autonomously take or follow the alternative travel route.

The second mobile device or second vehicle may presented the alert only after the second mobile device or second vehicle determines that the travel event is relevant to the second vehicle. This relevance may be determined, for example, via a determination that a location of the travel event is in the vicinity or within a predetermined distance of the second vehicle and along a route that the second vehicle is presently traveling.

Additionally or alternatively, the processor may be further configured to listen for a telematics data-related wireless communication or data transmission, and to store associated telematics data received via the communication unit in the memory unit when the telematics data-related wireless communication or data transmission is detected or within range. In addition, the communication unit may be further configured to relay or otherwise re-transmit the telematics data or the telematics data-related wireless communication or data transmission to other listening devices, including other vehicles, mobile devices, and/or smart infrastructure, for example.

The smart infrastructure component may include additional, less, or alternate functionality, including that discussed elsewhere herein and/or below.

Exemplary Intermediate Mobile Device/Smart Vehicle

In yet another aspect, an intermediate mobile device or smart vehicle configured to use telematics and/or other data from a first driver to facilitate safer vehicle travel for a second driver, the intermediate mobile device or smart vehicle may be provided. The intermediate mobile device or smart vehicle may include (1) a communication unit configured to receive a data transmission or wireless communication containing or including telematics data, the telematics data being generated and transmitted from a first mobile device or first smart vehicle associated with the first driver; (2) a memory unit configured to store vehicle navigation information, virtual road maps, and/or computer-readable instructions; (3) a processor configured to access the memory unit to automatically identify or determine: (i) a travel event; (ii) a Global Positioning System (GPS) location or other location of the travel event; and (iii) an estimated or actual geographical or temporal scope of the travel event from computer analysis of the telematics data, the processor further being configured to generate a travel event-related data transmission or wireless communication associated with or detailing the travel event, or location or extent thereof. The communication unit may be further configured to transmit the travel event-related data transmission or wireless communication to a second or destination mobile device and/or a second smart vehicle associated with the second driver via peer-to-peer (P2P) communication to facilitate the second mobile device or second smart vehicle taking corrective action to enable safer vehicle travel for the second driver based upon the telematics data associated with the first driver.

For instance, for the (a) remote server, (b) smart road-side infrastructure, and/or (c) intermediate mobile device or smart vehicle mentioned above, the travel (or traffic) event may be based upon (and/or determined from telematics data that reveals) vehicle, traffic, congestion, road construction, and/or weather conditions. As discussed above and elsewhere herein, the telematics data may include speed, acceleration, deceleration, location, lane information, and/or other data of, or associated with, the first mobile device and/or first smart vehicle. The telematics data may include time, braking, acceleration, left turn, right turn, heading, GPS (Global Positioning System) speed, GPS latitude and longitude, gyroscope data, battery level, and/or telephone usage information or data of, or associated with, the first mobile device and/or first vehicle.

The preventive or corrective action taken may be: generating or determining an alert, at or via the second mobile device and/or second vehicle (or second smart vehicle controller); presenting a visual alert, at or via the second mobile device and/or second vehicle (or second smart vehicle controller), on a display or display screen associated with the mobile device (and/or smart vehicle controller); and/or providing an audible alert, at or via the second mobile device and/or second vehicle. The alert may be presented only after the second mobile device (or second vehicle or vehicle controller) determines that the travel event is relevant to the second vehicle, such as by determining that a location of the travel event is in the vicinity of the second vehicle and/or along a route that the second vehicle is presently traveling.

The preventive or corrective action taken may be: generating, determining, and/or receiving an alternate travel route that avoids a GPS location of the travel (or traffic) event, at or via the second mobile device and/or second vehicle (or vehicle controller); and/or presenting the alternative travel route, at or via the second mobile device and/or second vehicle (or vehicle controller), on a display or display screen for use by the driver. Additionally or alternatively, the preventive or corrective action taken may be: generating, determining, and/or receiving an alternate travel route that avoids a GPS location of the travel (or traffic) event, at or via the second mobile device and/or second vehicle (or vehicle controller); and/or automatically directing the second vehicle to take or follow the alternative travel route, at or via the second mobile device and/or second vehicle (or vehicle controller), such as by directing an autonomous vehicle to take the alternate travel route.

The (a) remote server, (b) smart infrastructure component, and/or (c) intermediate mobile device or smart vehicle may be configured to: listen for a telematics data-related wireless communication and/or data transmission, and when the telematics data-related wireless communication and/or data transmission is detected and/or within range, then (i) receive the telematics data-related wireless communication and/or data transmission; (ii) store associated telematics data in a memory unit; and/or (iii) relay or otherwise re-transmit the telematics data and/or the telematics data-related wireless communication and/or data transmission to other listening devices, such as other vehicles, mobile device, remote servers, and/or smart infrastructure, for example.

The intermediate mobile device or smart vehicle may include additional, less, or alternate functionality, including that discussed elsewhere herein.

Insurance Applications

As noted herein, the present embodiments may be used to adjust, update, and/or generate insurance policies. Insurance policies, such as auto, usage-based, home, and/or household insurance policies, may be adjusted, updated, and/or generated for insureds or potential customers that have mobile devices and/or vehicles that are equipped or configured with one or more of the functionalities discussed herein.

For instance, insureds or family members may have mobile devices and/or vehicle that are configured to receive telematics data associated with other vehicles and/or abnormal road or travel conditions that other drivers are experiencing. The telematics may be received directly from other vehicles, or indirectly from smart infrastructure and/or insurance provider remote servers. As a result, the insureds and/or their family members may be timely notified of traffic or travel events and then may take alternate routes (or even not drive or delay driving) to lower their risk of getting in an accident due to the traffic or travel events. An insurance provider may promote or reward such risk-averse behavior and/or safer driving with lower insurance premiums, rates, and/or increased discounts, such as for usage-based or other types of auto insurance.

Furthermore, an insurance provider may promote or reward the use of one or more aspects described herein with lower insurance premiums, rates, and/or increased discounts. For example, an insurer may provide discounts or other incentives upon an insured customer installing an application to their mobile computing device that enables the mobile computing device to broadcast telematics data and/or to generate alert notifications based upon telematics data received from other devices.

Additionally or alternatively, an insurer may provide discounts or other incentives upon an amount that an insured customer uses the telematics application on their mobile computing device that enables the mobile computing device to broadcast telematics data and/or to generate alert notifications based upon telematics data received from other devices. Such usage-based discounts or incentives may be based upon amount of time of, or number of miles of, use or usage, e.g., an amount of time or miles that the insured drove during a specific period with a Telematics App running or executing on their mobile device (which was located within the insured vehicle as it travels), the Telematics App configured to collect and broadcast telematics data, and/or to receive telematics data from other vehicles or devices, and generate alerts or recommendations based upon the data received.

Additional Considerations

With the foregoing, an insurance customer may opt-in to a reward, insurance discount, or other type of program. After the insurance customer provides their affirmative consent, an insurance provider telematics application and/or remote server may collect telematics and/or other data (including image or audio data) associated with insured assets, including before, during, and/or after an insurance-related event or vehicle collision. In return, risk-averse drivers, and/or vehicle owners may receive discounts or insurance cost savings related to auto, home, life, and other types of insurance from the insurance provider.

In one aspect, telematics data, and/or other data, including the types of data discussed elsewhere herein, may be collected or received by an insured's mobile device or smart vehicle, a Telematics App (including those discussed herein), and/or an insurance provider remote server, such as via direct or indirect wireless communication or data transmission from a Telematics App running on the insured's mobile device, after the insured or customer affirmatively consents or otherwise opts-in to an insurance discount, reward, or other program. The insurance provider may then analyze the data received with the customer's permission to provide benefits to the customer. As a result, risk-averse customers may receive insurance discounts or other insurance cost savings based upon data that reflects low risk driving behavior and/or technology that mitigates or prevents risk to (i) insured assets, such as vehicles or even homes, and/or (ii) vehicle operators or passengers.

Although the disclosure provides several examples in terms of two vehicles, two mobile computing devices, two on-board computers, etc., aspects include any suitable number of mobile computing devices, vehicles, etc. For example, aspects include an external computing device receiving telematics data and/or geographic location data from a large number of mobile computing devices (e.g., 100 or more), and issuing alerts to those mobile computing devices in which the alerts are relevant in accordance with the various techniques described herein.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed:

1. A remote server configured to use telematics data associated with a first vehicle to facilitate safer vehicle travel for a second vehicle, the remote server comprising:
   a communication unit comprising a transceiver and configured to receive the telematics data associated with the first vehicle; and
   a processor configured to (i) identify a travel event, and (ii) generate a travel event-related data transmission indicative of information associated with the travel event based upon an analysis of the telematics data,
   wherein the communication unit is further configured to transmit the travel event-related data transmission to a second computing device or the second vehicle, which is associated with a second driver, when the travel event is relevant to the second computing device or the second vehicle based upon a location of the travel event, to thereby cause at least one of the second computing device or the second vehicle to
   (1) at least one of:
      (i) provide, via the second computing device, a graphical user interface (GUI) including a display of:
         (a) an indication of a description of the travel event, the indication of the description of the travel event including at least one of a text indication of the description or a graphical indication of the description, and
         (b) an indication of the location of the travel event, the indication of the location of the travel event including at least one of a text indication of the location, a graphical indication of the location, or a map indicating the location, or
      (ii) direct at least one other corrective action that affects driving of the second vehicle, and
   (2) display insurance policy pricing adjustment information associated with the second vehicle that is based upon a driver risk due to the identified travel event, so as to promote or reward risk averse behavior and safer driving.

2. The remote server of claim 1, wherein the processor is further configured to determine that the travel event is relevant to the second computing device or the second vehicle associated with the second driver when the travel event is located on a same road as that of the second computing device or the second vehicle.

3. The remote server of claim 1, wherein the telematics data indicates that the first vehicle is experiencing one or more of high traffic conditions, congestion, road construction, and extreme weather conditions.

4. The remote server of claim 1, wherein the telematics data is indicative of one or more of Global Positioning System (GPS) speed, GPS location, lane information associated with the first vehicle, time, turning associated with the first vehicle, GPS latitude and longitude, battery level associated with the first vehicle, and telephone usage information associated the first vehicle.

5. The remote server of claim 1, wherein the communication unit is further configured to relay the telematics data to smart infrastructure.

6. The remote server of claim 1, wherein the communication unit is configured to transmit the travel event-related data transmission to the second computing device or the second vehicle to thereby cause the at least one of the second computing device or the second vehicle to (i) generate an alternate travel route that avoids the location of the travel event, and (ii) present the alternate travel route via the GUI.

7. The remote server of claim 1, wherein the second vehicle is an autonomous vehicle, and wherein the communication unit is configured to transmit the travel event-related data transmission to the second computing device or the second vehicle to thereby cause the second vehicle to autonomously follow an alternate travel route that avoids the location of the travel event.

8. A smart infrastructure component configured to use telematics data from a first vehicle to facilitate safer travel for a second vehicle, the smart infrastructure component comprising:
 a communication unit comprising a transceiver and configured to receive the telematics data associated with the first vehicle; and
 a processor configured to (i) identify a travel event, and (ii) generate a travel event-related data transmission indicative of information associated with the travel event based upon an analysis of the telematics data,
 wherein the communication unit is further configured to transmit the travel event-related data transmission to a second computing device or the second vehicle, which is associated with a second driver, when the travel event is relevant to the second computing device or the second vehicle based upon a location of the travel event, to thereby cause at least one of the second computing device or the second vehicle to
 (1) at least one of:
 (i) provide, via the second computing device, a graphical user interface (GUI) including a display of:
 (a) an indication of a description of the travel event, the indication of the description of the travel event including at least one of a text indication of the description or a graphical indication of the description, and
 (b) an indication of the location of the travel event, the indication of the location of the travel event including at least one of a text indication of the location, a graphical indication of the location, or a map indicating the location, or
 (ii) direct at least one other corrective action that affects driving of the second vehicle, and
 (2) display insurance policy pricing adjustment information associated with the second vehicle that is based upon a driver risk due to the identified travel event, so as to promote or reward risk averse behavior and safer driving.

9. The smart infrastructure component of claim 8, wherein the processor is further configured to determine that the travel event is relevant to the second computing device or the second vehicle associated with the second driver when the travel event is located on a same road as that of the second computing device or the second vehicle.

10. The smart infrastructure component of claim 8, wherein the telematics data indicates that the first vehicle is experiencing one or more of high traffic conditions, congestion, road construction, and extreme weather conditions.

11. The smart infrastructure component of claim 8, wherein the telematics data is indicative of one or more of Global Positioning System (GPS) speed, GPS location, lane information associated with the first vehicle, time, turning associated with the first vehicle, GPS latitude and longitude, battery level associated with the first vehicle, and telephone usage information associated the first vehicle.

12. The smart infrastructure component of claim 8, wherein the communication unit is further configured to receive the telematics data relayed from a remote server, the remote server initially receiving the telematics data.

13. The smart infrastructure component of claim 8, wherein the communication unit is configured to transmit the travel event-related data transmission to the second computing device or the second vehicle to thereby cause the at least one of the second computing device or the second vehicle to (i) generate an alternate travel route that avoids the location of the travel event, and (ii) present the alternate travel route via the GUI.

14. The smart infrastructure component of claim 8, wherein the second vehicle is an autonomous vehicle, and wherein the communication unit is configured to transmit the travel event-related data transmission to the second computing device or the second vehicle to thereby cause the second vehicle to autonomously follow an alternate travel route that avoids the location of the travel event.

15. An intermediate mobile computing device configured to use telematics data from a first vehicle to facilitate safer vehicle travel for a second vehicle, the intermediate mobile device comprising:
 a communication unit comprising a transceiver and configured to receive the telematics data associated with the first vehicle; and
 a processor configured to (i) identify a travel event, and (ii) generate a travel event-related data transmission indicative of information associated with the travel event based upon an analysis of the telematics data,
 wherein the communication unit is further configured to transmit the travel event-related data transmission to a second computing device or the second vehicle, which is associated with a second driver, when the travel event is relevant to the second computing device or the second vehicle based upon a location of the travel event, to thereby cause at least one of the second computing device or the second vehicle to
 (1) at least one of:
 (i) provide, via the second computing device, a graphical user interface (GUI) including a display of:
 (a) an indication of a description of the travel event, the indication of the description of the travel event including at least one of a text indication of the description or a graphical indication of the description, and (b) an indication of the location of the travel event, the indication of the location of the travel event including at least one of a text indication of the location, a graphical indication of the location, or a map indicating the location, or (ii) direct at least one other preventive or corrective action that affects driving of the second vehicle, and (2) display insurance policy pricing adjustment information associated with the second vehicle that is based upon a driver risk due to the identified travel event, so as to promote or reward risk averse behavior and safer driving.

16. The intermediate mobile computing device of claim 15, wherein the processor is further configured to determine that the travel event is relevant to the second computing device or the second vehicle associated with the second driver when the travel event is located on a same road as that of the second computing device or the second vehicle.

17. The intermediate mobile computing device of claim 15, wherein the telematics data indicates that the first vehicle is experiencing one or more of high traffic conditions, congestion, road construction, and extreme weather conditions.

18. The intermediate mobile computing device of claim 15, wherein the telematics data is indicative of one or more of Global Positioning System (GPS) speed, GPS location, lane information associated with the first vehicle, time, turning associated with the first vehicle, GPS latitude and longitude, battery level associated with the first vehicle, and telephone usage information associated the first vehicle.

19. The intermediate mobile computing device of claim 15, wherein the communication unit is configured to transmit the travel event-related data transmission to the second computing device or the second vehicle to thereby cause the at least one of the second computing device or the second vehicle to (i) generate an alternate travel route that avoids the location of the travel event, and (ii) present the alternate travel route via the GUI.

20. The intermediate mobile computing device of claim 15, wherein the second vehicle is an autonomous vehicle, and wherein the communication unit is configured to transmit the travel event-related data transmission to the second computing device or the second vehicle to thereby cause the second vehicle to autonomously follow an alternate travel route that avoids the location of the travel event.

* * * * *